(12) United States Patent
Chang et al.

(10) Patent No.: US 7,839,369 B2
(45) Date of Patent: *Nov. 23, 2010

(54) LIQUID CRYSTAL DISPLAY HAVING CUTOUT ARRANGED AT PIXEL ELECTRODE WITH SPECIFIC POSITION FROM CUTOUT ARRANGED AT COMMON ELECTRODE, AND DRIVING METHOD THEREOF

(75) Inventors: Hak-Sun Chang, Seoul (KR); Ji-Won Sohn, Seoul (KR); Nak-Cho Choi, Seoul (KR); Hyun-Wuk Kim, Yongin-si (KR); Chang-Hun Lee, Yongin-si (KR); Jae-Jin Lyu, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1048 days.

This patent is subject to a terminal disclaimer.

(21) Appl. No.: 11/239,345

(22) Filed: Sep. 30, 2005

(65) Prior Publication Data

US 2006/0071927 A1     Apr. 6, 2006

(30) Foreign Application Priority Data

Oct. 4, 2004 (KR) ............... 10-2004-0078711

(51) Int. Cl.
*G09G 5/10* (2006.01)
*G09G 3/36* (2006.01)

(52) U.S. Cl. .................. 345/89; 345/690
(58) Field of Classification Search ............ 345/87, 345/89, 92, 93, 690–693; 349/139, 129, 349/130, 144, 146
See application file for complete search history.

(56) References Cited

U.S. PATENT DOCUMENTS

| 6,466,293 | B1 | 10/2002 | Suzuki et al. | |
| 7,057,695 | B2 * | 6/2006 | Mun et al. | 349/141 |
| 2003/0058264 | A1 | 3/2003 | Takako et al. | |
| 2004/0070713 | A1 * | 4/2004 | Song | 349/129 |
| 2004/0085272 | A1 | 5/2004 | Ting et al. | |
| 2006/0038952 | A1 * | 2/2006 | Chang et al. | 349/139 |

FOREIGN PATENT DOCUMENTS

| JP | 09080390 | 3/1997 |
| JP | 10096929 | 4/1998 |

(Continued)

*Primary Examiner*—Amare Mengistu
*Assistant Examiner*—Aaron Midkiff
(74) *Attorney, Agent, or Firm*—Cantor Colburn LLP

(57) ABSTRACT

A liquid crystal display is provided, which includes: a plurality of pixels; a gray voltage generator generating a plurality of gray voltages; an image signal modifier that receives first, second, and third image signals for a pixel in three successive frames, generates a preliminary signal for the second image signal based on the first image signal, and generates a modified signal for the second image signal based on the preliminary signal and the third image signal; and a data driver converting the modified signal into a data voltage selected from the gray voltages and applying the data voltage to the pixel, wherein a range of the gray voltages is substantially equal to a range of target voltages for obtaining target luminance of the pixel, and a highest available value for the modified signal is equal to a highest available value of the image signals.

26 Claims, 13 Drawing Sheets

FOREIGN PATENT DOCUMENTS

| | | |
|---|---|---|
| JP | 11052360 | 2/1999 |
| JP | 11295740 | 10/1999 |
| JP | 2000193980 | 7/2000 |
| JP | 2002-296594 | 10/2002 |
| JP | 2003172915 | 6/2003 |
| JP | 2004004665 | 1/2004 |
| KR | 19990068732 | 9/1999 |
| KR | 1020030057638 | 7/2003 |

* cited by examiner

US 7,839,369 B2

LIQUID CRYSTAL DISPLAY HAVING CUTOUT ARRANGED AT PIXEL ELECTRODE WITH SPECIFIC POSITION FROM CUTOUT ARRANGED AT COMMON ELECTRODE, AND DRIVING METHOD THEREOF

CROSS REFERENCE TO RELATED APPLICATION

This application claims priority to and the benefit of Korean Patent Application No. 10-2004-0078711, filed on Oct. 4, 2004, which is hereby incorporated by reference for all purposes as if fully set forth herein.

BACKGROUND OF THE INVENTION

1. Field of the Invention

The present invention relates to a liquid crystal display and a driving method thereof.

2. Description of Related Art

A liquid crystal display (LCD) includes a pair of panels including a plurality of pixel electrodes and a common electrode and a liquid crystal (LC) layer arranged between the panels and having dielectric anisotropy. The pixel electrodes are arranged in a matrix and connected with switching elements, such as thin film transistors (TFTs). The pixel electrodes are supplied with data voltages through the TFTs in a row by row manner. The common electrode covers an entire surface of a panel and is supplied with a common electrode. The pixel electrode, the common electrode, and the LC layer arranged therebetween form a LC capacitor. The LC capacitor and the switching element are the basic elements forming a pixel.

The LCD generates an electric field in the LC layer by applying voltages to the electrodes, and obtains desired images by controlling the strength of the electric field to vary the transmittance of light incident upon the LC layer.

Among the LCDs, a vertical alignment (VA) mode LCD, which aligns LC molecules such that the long axes of the LC molecules are substantially perpendicular to the panels in the absence of an electric field, is used because such mode has a high contrast ratio and wide reference viewing angle.

The wide viewing angle of the VA mode LCD may be obtained by having cutouts formed in the field-generating electrodes and protrusions formed on the field-generating electrodes. Since the cutouts and the protrusions may determine the tilt directions of the LC molecules, several tilt directions may be used to widen the reference viewing angle.

LCDs are increasingly being used to display motion images. The response time of the liquid crystal is an important characteristic of the LCD. In particular, as the size of the LCD increases, the resolution of the LCD decreases unless the response time of the liquid crystal is increased.

Liquid crystal having a slow response time takes longer for a pixel to reach a desired luminance. The time for obtaining the desired luminance depends on the difference between a target voltage for giving the desired luminance and a previously charged voltage across the LC capacitor of the pixel. Thus, the pixel may not reach the desired luminance by a given time when the voltage difference is large.

To solve the above problem, dynamic capacitance compensation (DCC) for improving the response time without changing the characteristics of the liquid crystal itself may be used. The DCC applies a voltage that is greater than the target voltage to the LC capacitor to reduce the time for reaching the desired luminance. However, the improvement of the response time given by the DCC may be insufficient when the target voltage is greater than the voltage applied by the DCC.

Thus, the LC molecules should be pre-tilted before a voltage that is higher than the target voltage is applied thereto. However, applying such a voltage that is higher requires that the highest target voltage be less than a highest available voltage. As such, the luminance corresponding to the highest target voltage may be relatively low and the number of grays is limited.

SUMMARY OF THE INVENTION

This invention provides a liquid crystal display (LCD) apparatus having an improved driving method that improves a response time of liquid crystals, thereby improving luminance and display quality of the LCD.

Additional features of the invention will be set forth in the description which follows, and in part will be apparent from the description, or may be learned by practice of the invention.

The present invention discloses a LCD including a first substrate; a first signal line arranged on the first substrate; a second signal line arranged on the first substrate and intersecting the first signal line; a thin film transistor coupled with the first signal line and the second signal line; a pixel electrode coupled with the thin film transistor; a second substrate facing the first substrate; a common electrode arranged on the second substrate; a liquid crystal layer interposing the first substrate and the second substrate; a first tilt direction determining member arranged on the first substrate; and a second tilt direction determining member arranged on the first substrate, wherein the first tilt direction determining member is positioned about 15 microns to about 25 microns apart from the second tilt direction determining member.

The present invention also discloses an LCD including a first substrate; a gate line arranged on the first substrate; a gate insulating layer arranged on the gate line; a semiconductor layer arranged on the gate insulating layer; a data line arranged on the gate insulating layer and on the semiconductor layer; a drain electrode arranged on the semiconductor layer and kept apart from the data line; a pixel electrode coupled with the drain electrode and including a first cutout; a second substrate facing the first substrate; and a common electrode arranged on the second substrate and including a second cutout, wherein the first cutout is positioned about 15 microns to about 25 microns apart from the second cutout.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
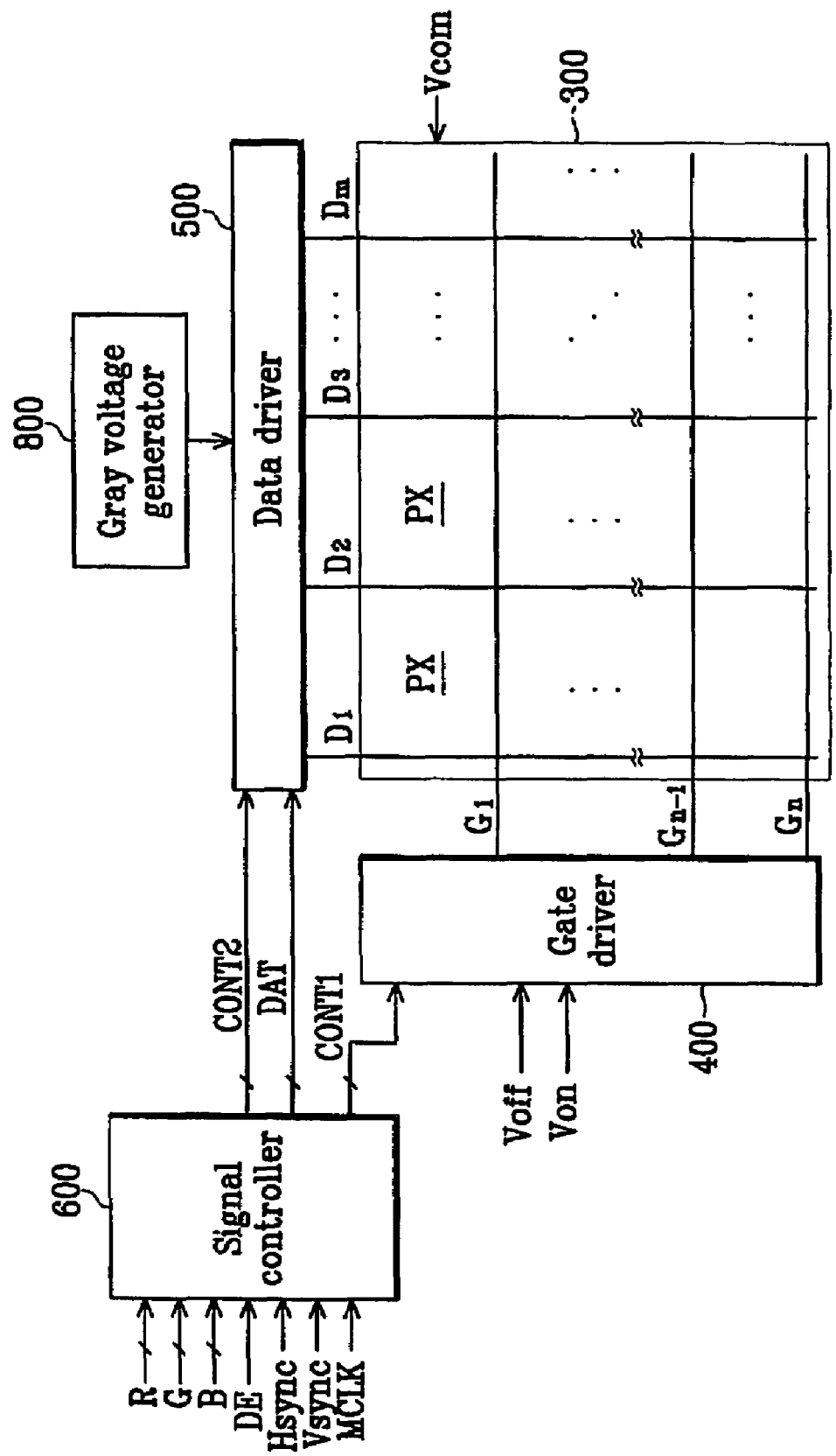
FIG. 1 is a block diagram of an LCD according to an embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

A liquid crystal display according to an embodiment of the invention is described below with reference to FIG. 1 and FIG. 2.

FIG. 1 is a block diagram of an LCD according to an embodiment of the invention. FIG. 2 is an equivalent circuit diagram of a pixel of an LCD according to an embodiment of the invention.

Referring to FIG. 1, an LCD includes a liquid crystal (LC) panel assembly 300, a gate driver 400 and a data driver 500 that are coupled with the panel assembly 300, a gray voltage generator 800 coupled with data driver 500, and a signal controller 600 controlling the above elements.

The panel assembly 300 includes a plurality of signal lines $G_1$-$G_n$ and $D_1$-$D_m$ and a plurality of pixels PX connected e.g., coupled, with the signal lines $G_1$-$G_n$ and $D_1$-$D_m$ and arranged substantially in a matrix format. As shown in FIG. 2, the panel assembly 300 includes a lower panel 100 and an upper panel 200 facing each other and a LC layer 3 arranged between the upper panel 100 and the lower panel 200.

The signal lines include a plurality of gate lines $G_1$-$G_n$ transmitting gate signals (referred to as scanning signals) and a plurality of data lines $D_1$-$D_m$ transmitting data signals. The gate lines $G_1$-$G_n$ extend substantially in a row direction and are substantially parallel to each other. The data lines $D_1$-$D_m$ extend substantially in a column direction and are substantially parallel to each other. The gate lines $G_1$-$G_n$ and the data lines $D_1$-$D_m$ are substantially perpendicular to each other.

Figure 2:
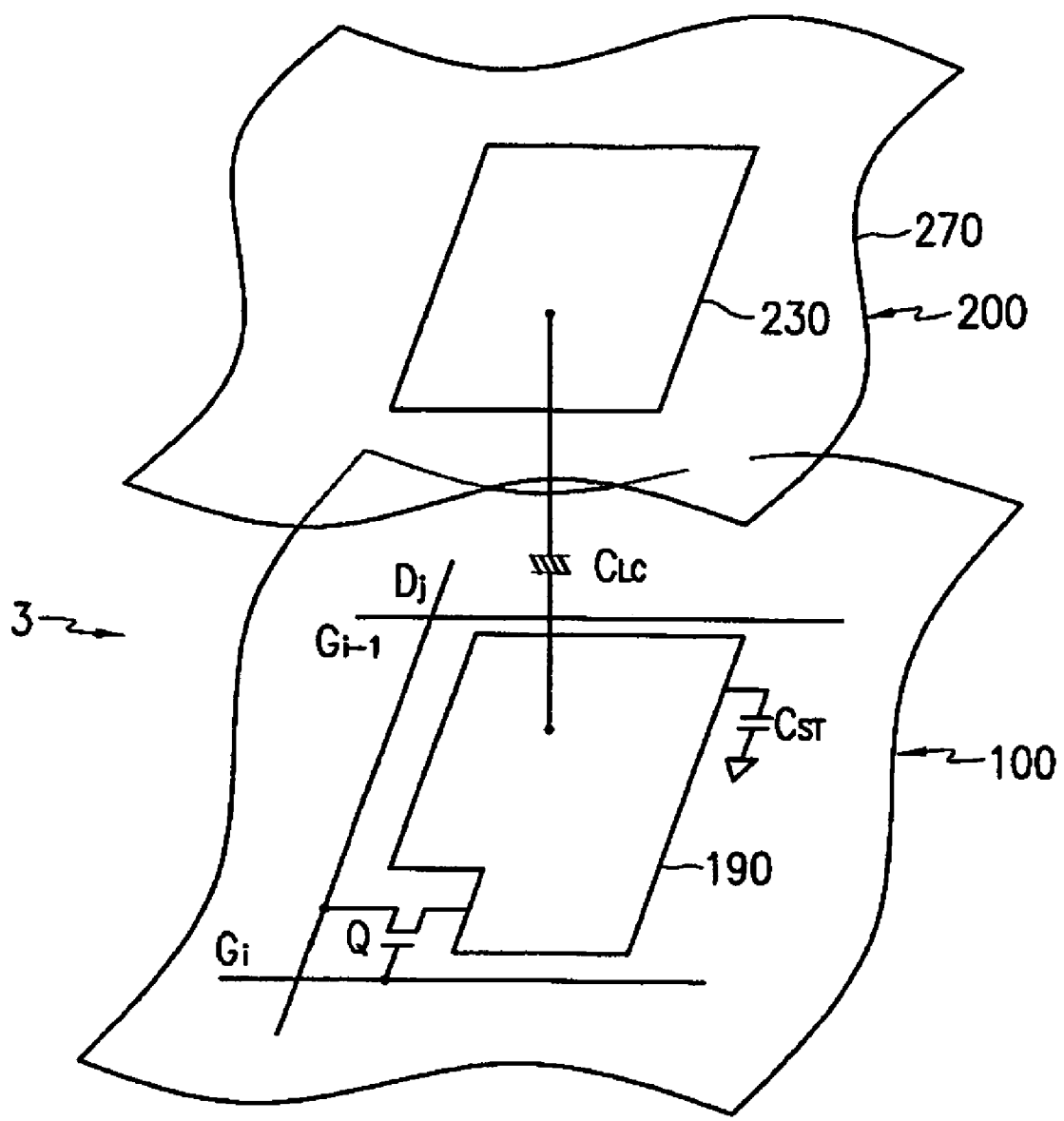
FIG. 2 is an equivalent circuit diagram of a pixel of an LCD according to an embodiment of the invention.

Referring to FIG. 2, for example, each pixel PX connected e.g., coupled, with the i-th gate line $G_i$(i=1, 2, ..., n) and the j-th data line $D_j$(j=1, 2, ..., m) and includes a switching element Q connected e.g., coupled, with the signal lines $G_i$ and $D_j$, and a LC capacitor $C_{LC}$ and a storage capacitor $C_{ST}$ that are connected e.g., coupled, with the switching element Q. It is understood that the storage capacitor $C_{ST}$ may be omitted.

The switching element Q is arranged on the lower panel 100 and includes multiple terminals, e.g., a control terminal connected e.g., coupled, with the gate line $G_i$, an input terminal connected e.g., coupled, with the data line $D_j$, and an output terminal connected e.g., coupled, with the LC capacitor $C_{LC}$ and the storage capacitor $C_{ST}$.

The LC capacitor $C_{LC}$ includes a pixel electrode 190 arranged on the lower panel 100 and a common electrode 270 arranged on the upper panel 200 as two terminals. The LC layer 3 arranged between the two electrodes 190 and 270 operates as a dielectric of the LC capacitor $C_{LC}$. The pixel electrode 190 is connected e.g., coupled, with the switching element Q, and the common electrode 270 is supplied with a common voltage Vcom and covers an entire surface of the upper panel 200. Unlike the pixel shown in FIG. 2, the common electrode 270 may be arranged on the lower panel 100, and the pixel electrode 190 and/or the common electrode 270 may have a shape of bar or stripe.

The storage capacitor $C_{ST}$ is an auxiliary capacitor for the LC capacitor $C_{LC}$. The storage capacitor $C_{ST}$ includes the pixel electrode 190 and a separate signal line, which is arranged on the lower panel 100, overlaps the pixel electrode 190 via an insulator arranged therebetween, and is supplied with a predetermined voltage such as the common voltage Vcom. Alternatively, the storage capacitor $C_{ST}$ may include the pixel electrode 190 and an adjacent gate line, referred to as a previous gate line, which overlaps the pixel electrode 190 via an insulator.

For displaying color, each pixel may represent one of primary colors (spatial division) or each pixel may sequentially represent the primary colors in turn (temporal division) such that a spatial or a temporal sum of the primary colors is recognized as a desired color. The set of primary colors may include a red color, a green color, and a blue color. FIG. 2 shows an example of the spatial division that each pixel includes a color filter 230 representing one of the primary colors along the upper panel 200 facing the pixel electrode 190. Alternatively, the color filter 230 may be arranged on or under the pixel electrode 190 on the lower panel 100.

One or more polarizers (not shown) may be attached with the panel assembly 300.

The LC panel assemblies according to embodiments of the invention are described below with reference to FIGS. 3, 4, 5, and 6.

Figure 3:
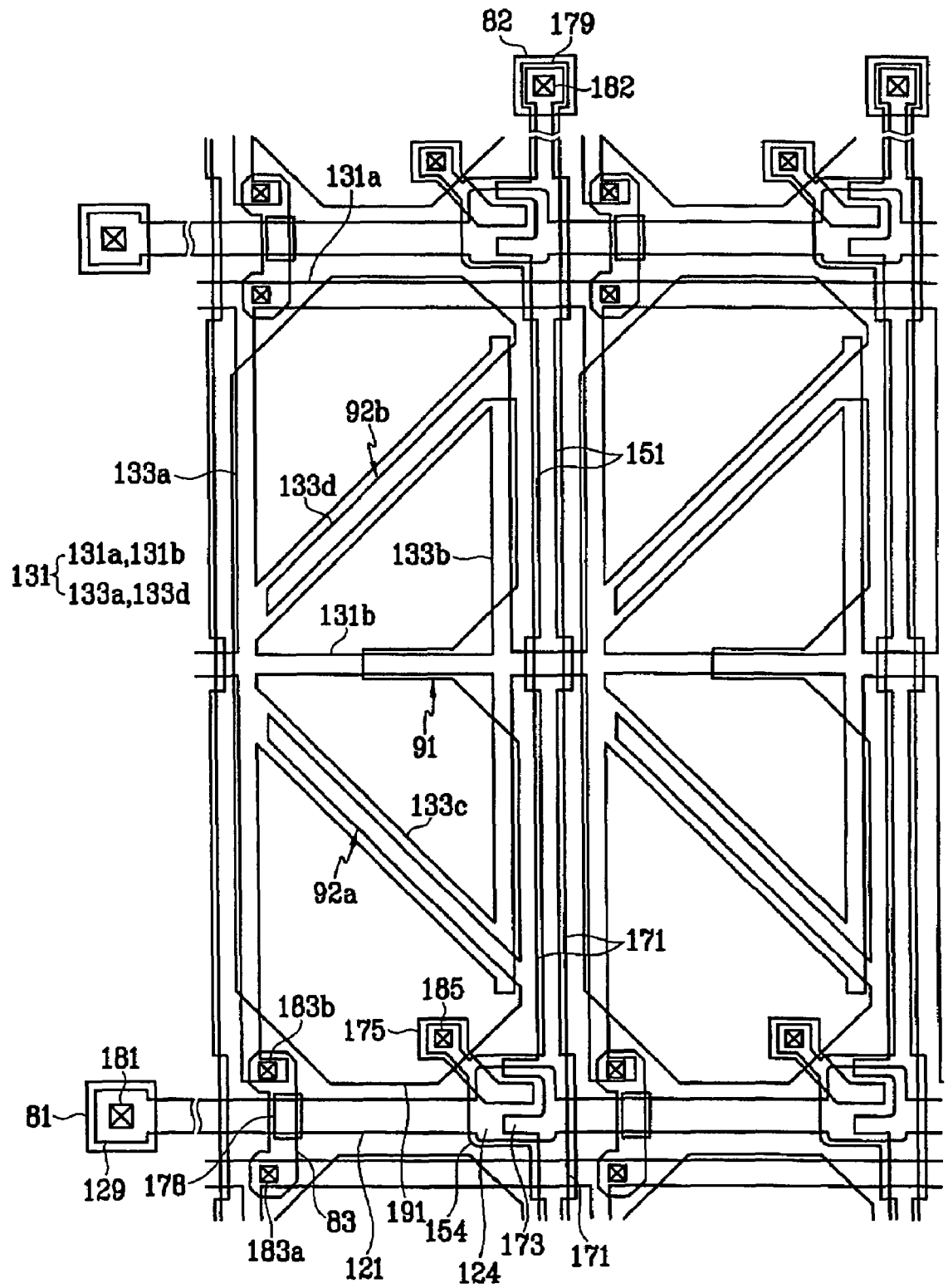
FIG. 3 is a layout view of a TFT array panel for an LCD according to an embodiment of the invention.
Figure 4:
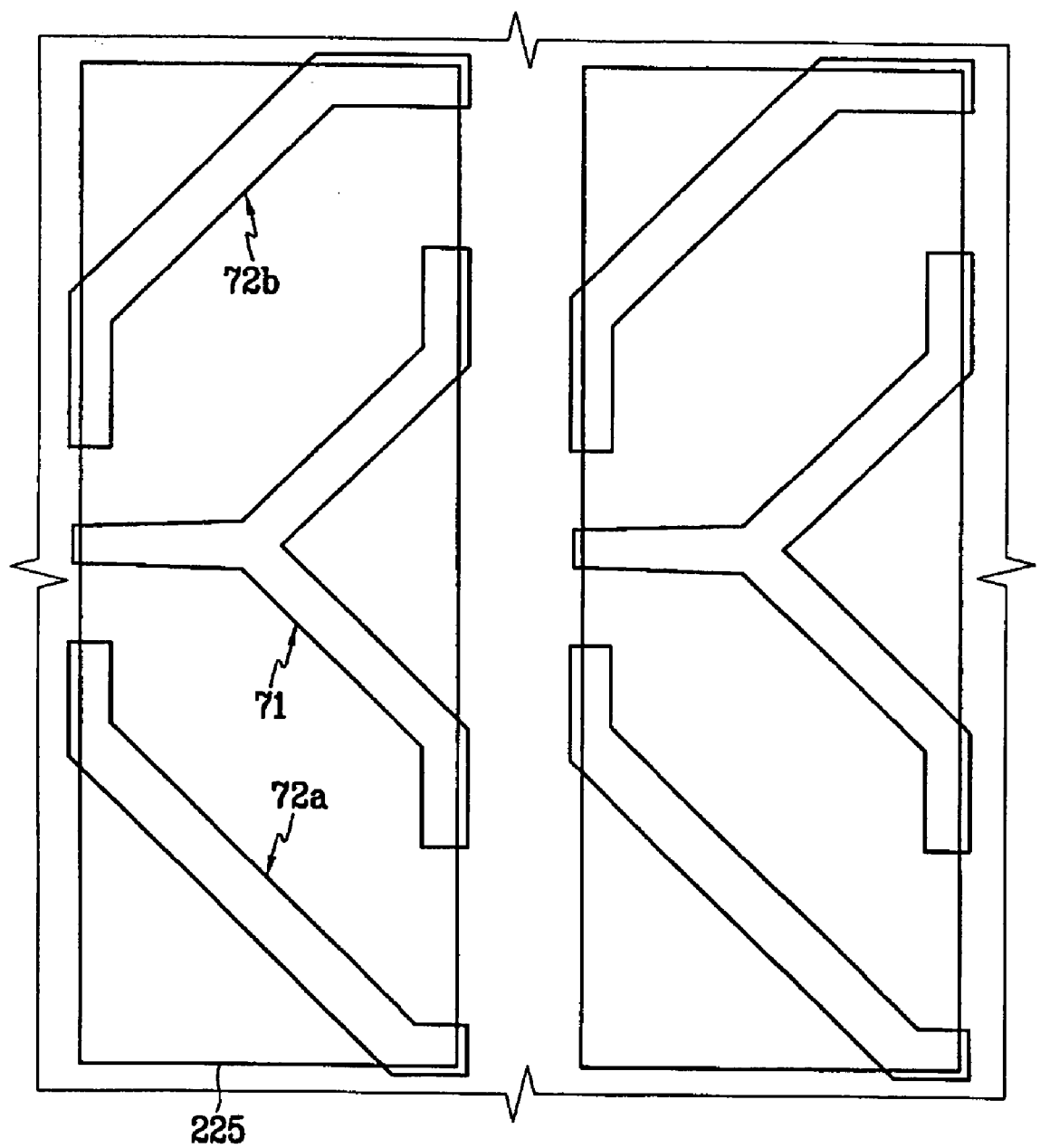
FIG. 4 is a layout view of a common electrode panel of an LC panel assembly according to an embodiment of the invention.
Figure 5:
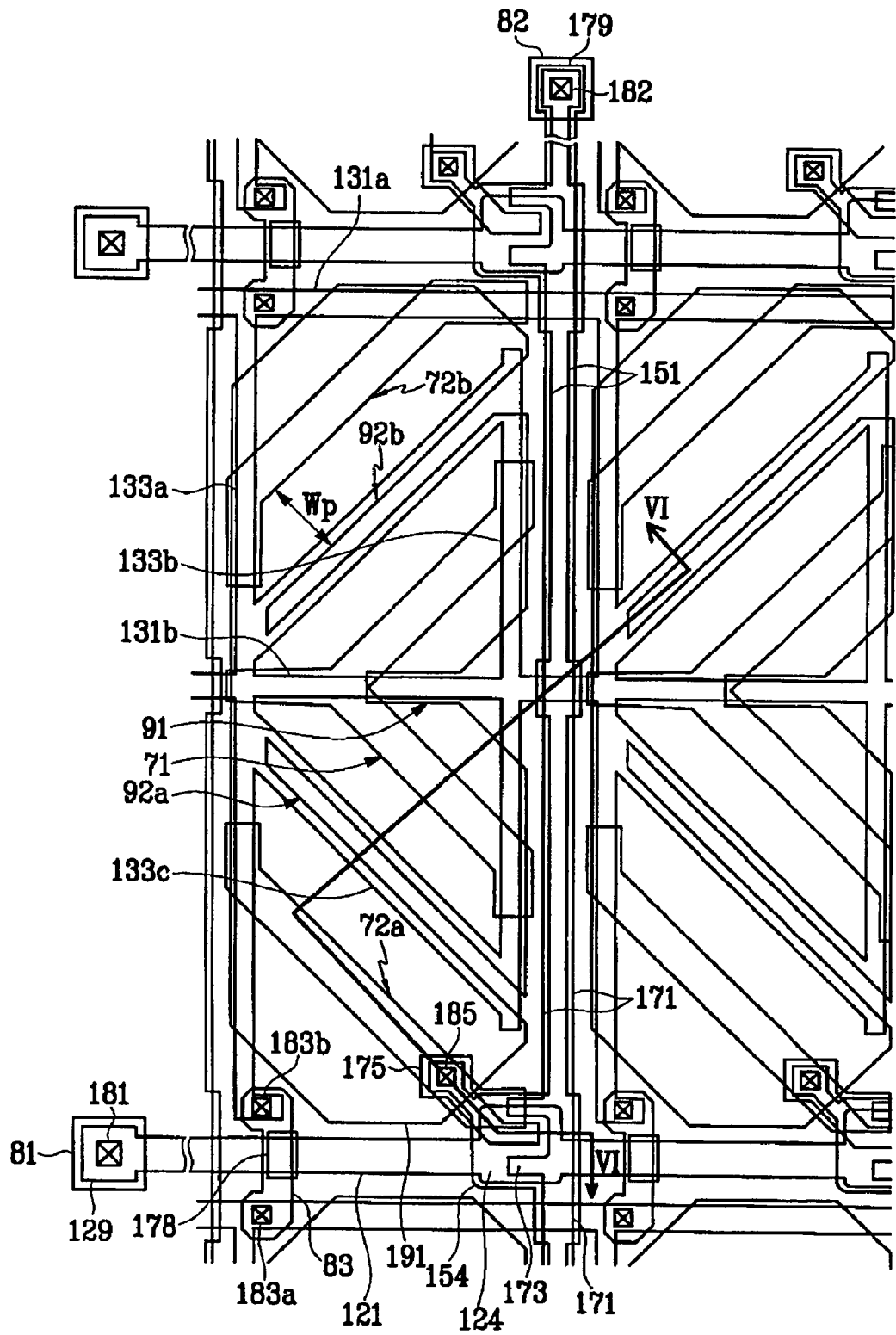
FIG. 5 is a layout view of an LC panel assembly including the TFT array panel shown in FIG. 3 and the common electrode panel shown in FIG. 4.
Figure 6:
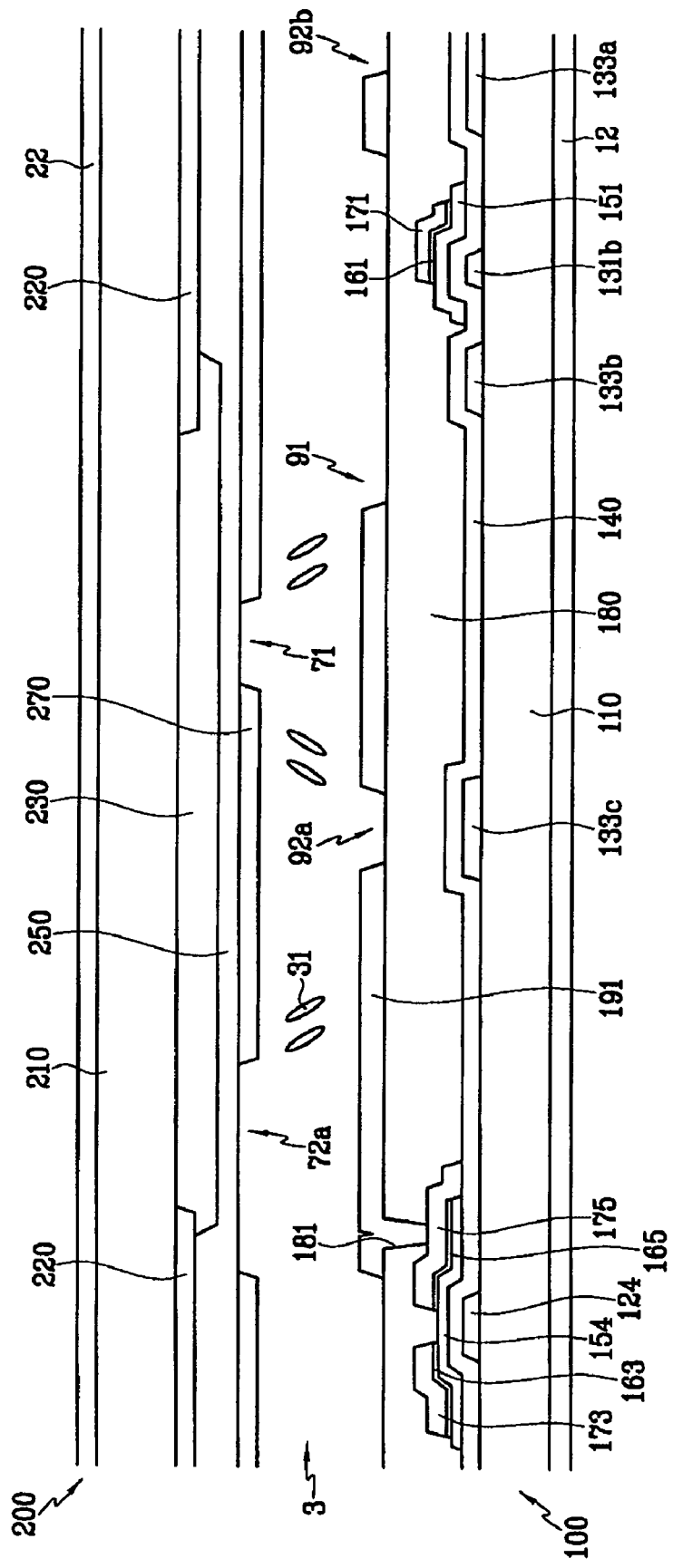
FIG. 6 is a sectional view of the LC panel assembly shown in FIG. 5 taken along line VI-VI.

FIG. 3 is a layout view of a TFT array panel for an LCD according to an embodiment of the invention. FIG. 4 is a layout view of a common electrode panel of an LC panel assembly according to an embodiment of the invention. FIG. 5 is a layout view of an LC panel assembly including the TFT array panel shown in FIG. 3 and the common electrode panel shown in FIG. 4. FIG. 6 is a sectional view of the LC panel assembly shown in FIG. 5 taken along line VI-VI.

An LC panel assembly according to an embodiment of the invention includes a TFT array panel 100, a common electrode panel 200 facing the TFT array panel 100, and a LC layer 3 arranged between the TFT array panel 100 and the common electrode panel 200.

The TFT array panel 100 is described below with reference to FIGS. 3, 5 and 6.

A plurality of gate lines 121 and a plurality of storage electrode lines 131 are arranges on an insulating substrate 110 such as transparent glass or plastic.

The gate lines 121 transmit gate signals and extend substantially in a transverse direction. Each gate line 121 includes a plurality of gate electrodes 124 projecting upward and downward and an end portion 129 having an area sufficient for contact with another layer or an external driving circuit. A gate driving circuit (not shown) for generating the gate signals may be mounted or attached on a flexible printed circuit (FPC) film (not shown), which may be attached with to the insulating substrate 110, directly mounted on the insulating substrate 110, or integrated onto the insulating substrate 110. The gate lines 121 may connect with a driving circuit that may be integrated on the insulating substrate 110.

The storage electrodes 131 are supplied with a predetermined voltage, and each of the storage electrode lines 131 includes a pair of a first stem 131a and second stem 131b that extend substantially parallel to the gate lines 121 and a plurality of sets of first, second, third, and fourth storage electrodes 133a, 133b, 133c and 133d branched from the first stem 131a and the second stem 131b. Each of the storage electrode lines 131 is arranged between two adjacent gate lines 121, and the first stem 131a is close to the upper one of the two adjacent gate lines 121, while the second stem 131b is substantially centered between the two gate lines 121.

The first storage electrode 133a extends from the first stem 131a, passes through the second stem 131b, and ends near a gate line 121 such that it has a fixed end portion and a free end portion at opposite ends. The fixed end portion is connected e.g., coupled, with the first stem 131a, and the free end portion has a projection.

The second storage electrode 133b extends above and below the second stem 131b.

The third storage electrode 133c and the fourth storage electrode 133d extend from approximately a center position of the first storage electrode 133a and an upper end and a lower end of the second storage electrode 133b, respectively.

However, it is understood that the storage electrode lines 131 may be formed having have various shapes and arrangements.

The gate lines 121 and the storage electrode lines 131 may be made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the films may be made of a low resistivity metal including Al containing metal, Ag containing metal, and Cu containing metal for reducing signal delay or voltage drop. Another film may be made of a material such as Mo containing metal, Cr, Ta, or Ti, which has good physical, chemical, and electrical contact characteristics with other materials such as indium tin oxide (ITO) or indium zinc oxide (IZO). For example, the combination of the two films may include a lower Cr film and an upper Al (alloy) film and a lower Al (alloy) film and an upper Mo (alloy) film. However, it is understood that the gate lines 121 and the storage electrode lines 131 may be formed of various metals or conductors.

The lateral sides of the gate lines 121 and the storage electrode lines 131 are inclined relative to a surface of the substrate 110. The inclination angle thereof may range from about 30 to about 80 degrees.

A gate insulating layer 140, which may be formed of silicon nitride (SiNx) or silicon oxide (SiOx), is arranged on the gate lines 121 and the storage electrode lines 131.

A plurality of semiconductor stripes 151, which may be made of hydrogenated amorphous silicon (abbreviated to "a-Si") or polysilicon, are arranged on the gate insulating layer 140. The semiconductor stripes 151 extend substantially in the longitudinal direction and wider near the gate lines 121 and the storage electrode lines 131 such that the semiconductor stripes 151 cover sufficiently large areas of the gate lines 121 and the storage electrode lines 131. Each of the semiconductor stripes 151 includes a plurality of projections 154 that extend toward the gate electrodes 124.

A plurality of ohmic contact stripes 161 and ohmic contact islands 165 are formed on the semiconductor stripes 151. The ohmic contact stripes 161 and ohmic contact islands 165 may be made of n+ hydrogenated a-Si heavily doped with an n type impurity such as phosphorous or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts strips 161 and ohmic contact islands 165 are inclined relative to the surface of the substrate 110. The inclination angles thereof may range from about 30 to about 80 degrees.

A plurality of data lines 171, a plurality of drain electrodes 175, and a plurality of isolated metal pieces 178 are arranged on the ohmic contacts strips 161 and ohmic contact islands 165 and the gate insulating layer 140.

The data lines 171 transmit data signals and extend substantially in the longitudinal direction to intersect the gate lines 121. Each data line 171 also intersects the first stem 131a and the second stem 131b of the storage electrode lines 131 and is arranged between adjacent pairs of storage electrodes 133a, 133b, 133c, and 133d. Each data line 171 includes a plurality of source electrodes 173 extending toward the gate electrodes 124 and an end portion 179 having a sufficiently large area for contact with another layer or an external driving circuit. A data driving circuit (not shown) for generating the data signals may be mounted or attached on a FPC film (not shown), which may be attached with the substrate 110, directly mounted on the substrate 110, or integrated onto the substrate 110. The data lines 171 may extend to be connected e.g., coupled, with a driving circuit that may be integrated on the substrate 110.

The drain electrodes 175 are kept apart from the data lines 171 and arranged opposite to the source electrodes 173 with respect to the gate electrodes 124. Each drain electrode 175 includes a relatively wide end portion and a relatively narrow end portion. The narrow end portion is partly enclosed by a curved source electrode 173.

The gate electrode 124, the source electrode 173, the drain electrode 175, and the projection 154 of the semiconductor stripe 151 together form a TFT having a channel formed in the projection 154 arranged between the source electrode 173 and the drain electrode 175.

The metal pieces 178 are arranged on the gate lines 121 near the end portions of the first storage electrodes 133a.

The data lines 171, the drain electrodes 175, and the metal pieces 178 may be made of a refractory metal such as Cr, Mo, Ta, Ti, or an alloy thereof. However, they may have a multi-layered structure that includes a refractory metal film (not shown) and a low resistivity film (not shown). For example, the multi-layered structure may be a double-layered structure that includes a lower Cr/Mo (alloy) film and an upper Al (alloy) film, or a triple-layered structure that include a lower Mo (alloy) film, an intermediate Al (alloy) film, and an upper Mo (alloy) film. However, it is understood that the data lines 171, the drain electrodes 175, and the metal pieces 178 may be made of various metals or conductors.

The data lines 171, the drain electrodes 175, and the metal pieces 178 each have an inclined edge profile. The inclination angles thereof range about 30 to about 80 degrees.

The ohmic contacts stripes 161 and ohmic contact islands 165 are only arranged between the underlying semiconductor stripes 151 and the overlying conductors 171 and 175 thereon and reduce the contact resistance therebetween. Although the semiconductor stripes 151 are narrower than the data lines 171 at most areas, the semiconductor stripes 151 widens near the gate lines 121 and the first stems 131a and the second stems 131b of the storage electrode lines 131 as described above, to substantially smooth the profile of the surface, thereby preventing or substantially preventing the data lines 171 from disconnecting. The semiconductor stripes 151 include some exposed portions, which are not covered with the data lines 171, the drain electrodes 175, and the metal pieces 178, such as portions located between the source electrodes 173 and the drain electrodes 175.

A passivation layer 180 may be provided on the data lines 171, the drain electrodes 175, the metal pieces 178, and the exposed portions of the semiconductor stripes 151. The passivation layer 180 may be made of an inorganic insulator or an organic insulator and the passivation layer may have a substantially level top surface. For example, the inorganic insulator may include silicon nitride and silicon oxide. The organic insulator may have a photosensitivity and dielectric constant that is less than about 4.0. The passivation layer 180 may include a lower film of inorganic insulator and an upper film of organic insulator such that it exhibits the excellent insulating characteristics of the organic insulator while preventing the exposed portions of the semiconductor stripes 151 from being damaged by the organic insulator.

The passivation layer 180 includes a plurality of contact holes 182 and 185 exposing the end portions 179 of the data lines 171 and the drain electrodes 175, respectively. The passivation layer 180 and the gate insulating layer 140 include a plurality of contact holes 181 that expose the end portions 129 of the gate lines 121, a plurality of contact holes 183a that expose portions of the storage electrode lines 131 near the fixed end portions of the first storage electrodes 133a, and a plurality of contact holes 183b that expose the linear branches of the free end portions of the first storage electrodes 133a.

A plurality of pixel electrodes 191, a plurality of overpasses 83, and a plurality of contact assistants 81 and 82 may be arranged on the passivation layer 180. They may be made of a transparent conductor such as ITO or IZO or a reflective conductor such as Ag, Al, Cr, or an alloy thereof.

The pixel electrodes 191 are physically and electrically connected e.g., coupled, with the drain electrodes 175 through the contact holes 185 such that the pixel electrodes 191 receive data voltages from the drain electrodes 175. The pixel electrodes 191 supplied with the data voltages generate an electric field in cooperation with a common electrode 270 of the common electrode panel 200 that is supplied with a common voltage, which determine the orientations of liquid crystal molecules 31 of the liquid crystal layer 100 that is arranged between the pixel electrode 191 and the common electrode 270. The pixel electrode 191 and the common electrode 270 together form a capacitor referred to as a liquid crystal capacitor, which stores applied voltages after the TFT turns off.

A pixel electrode 191 overlaps a storage electrode line 131 that includes storage electrodes 133a, 133b, 133c, and 133d. The pixel electrode 191 and a drain electrode 175 coupled thereto and the storage electrode line 131 form an additional capacitor referred to as a storage capacitor, which improves/increases the voltage storing capacity of the liquid crystal capacitor.

Each pixel electrode 191 has a substantially rectangle shape with primary edges being parallel to the gate lines 121 or the data lines 171 and having chamfered edges. The chamfered edges of the pixel electrode 191 may form an angle of about 45 degrees with respect to the gate lines 121.

Each pixel electrode 191 has a substantially center cutout 91, a lower cutout 92a, and an upper cutout 92b, which divide the pixel electrode 191 into a plurality of partitions. The cutouts 91, 92a, and 92b are substantially, inversely symmetrical inversion symmetry with respect to a second stem 131b of a storage electrode line 131.

The lower cutout 92a and the upper cutout 92b obliquely extend from a first edge of the pixel electrode 191 to approximately a second a center of the edge, e.g., opposite to the first edge, of the pixel electrode 191 and overlap with the third storage electrode 133c and the fourth storage electrode 133d, respectively. The lower and the upper cutouts 92a and 92b are disposed at a lower half and an upper half of the pixel electrode 191, respectively, which may be divided by the second stem 131b of the storage electrode line 131. The lower cutout 92a and the upper cutout 92b form an angle of about 45 degrees with respect to the gate lines 121, and they extend substantially perpendicular to each other. The first edge may be a right edge of the pixel electrode and the second edge may be a left edge of the pixel electrode.

The center cutout 91 extends along the second stem 131b of the storage electrode line 131 and includes an inlet from the first edge of the pixel electrode 191, which includes a pair of inclined edges that are substantially parallel to the lower cutout 92a and the upper cutout 92b, respectively.

Accordingly, the lower half of the pixel electrode 191 is divided into two lower partitions by the lower cutout 92a and the upper half of the pixel electrode 191 is partitioned into two upper partitions by the upper cutout 92b. The number of partitions and/or the number of the cutouts varies depending on design factors such as the size of pixels, the ratio of the transverse edges and the longitudinal edges of the pixel electrode 191, the type and characteristics of the liquid crystal layer 3, etc.

The contact assistants 81 and 82 are connected e.g., coupled, with the end portions 129 of the gate lines 121 and the end portions 179 of the data lines 171 via the contact holes 181 and 182, respectively. The contact assistants 81 and 82 protect the end portions 129 and 179 and improve/increase the adhesion between the end portions 129 and 179 and external devices.

The overpasses 83 cross over the gate lines 121 and they are connected e.g., coupled, with the exposed portions of the storage electrode lines 131 and the projections of the free end portions of the first storage electrodes 133a through the contact holes 183a and 183b, respectively, which are arranged opposite to each other with respect to the gate lines 121. The storage electrode lines 131 including the storage electrodes 133a-133d along with the overpasses 83 may be used to repair repairing defects in the gate lines 121, the data lines 171, or the TFTs.

The common electrode panel 200 is described below with reference to FIGS. 4, 5, and 6.

A light blocking member 220, commonly referred to as a black matrix, may be is formed on an insulating substrate 210 such as transparent glass or plastic. The light blocking member 220 includes a plurality of openings 225 facing the pixel electrodes 191, the light blocking members 220 having substantially the same planar shape as the pixel electrodes 191 to block light leakage between the pixel electrodes 191. Alternatively, the light blocking member 220 may include linear portions corresponding to the data lines 171 and planar portions corresponding to the TFTs.

A plurality of color filters 230 maybe formed on the substrate 210 and arranges substantially in the openings 225 defined by the light blocking member 220. The color filters 230 may extend substantially in a the longitudinal direction along the pixel electrodes 191. The color filters 230 may represent one of the primary colors such as red, green and blue.

An overcoat 250, which may be made of an (organic) insulator material, may be formed on the color filters 230 and the light blocking member 220. The overcoat 250 prevents the color filters 230 from being exposed and provides a substantially level surface. It is understood that the overcoat 250 may be omitted.

A common electrode 270 may be arranged on the overcoat 250. The common electrode 270 may be made of a transparent conductive material such as ITO and IZO and includes a plurality of sets of cutouts 71, 72a, and 72b.

A set of cutouts 71, 71a, and 72b are arranged to face a pixel electrode 191 and they include a center cutout 71, a lower cutout 72a, and an upper cutout 72b. Each of the cutouts 71, 72a and 72b is arranged between adjacent cutouts 91, 92a and 92b of the pixel electrode 191 or between a cutout 92a or 92b and a chamfered edge of the pixel electrode 191. In addition, each of the cutouts 71-72b includes at least one oblique portion extending parallel to the lower cutout 92a or the upper cutout 92b of the pixel electrode 191. The distance Wp between adjacent edges of adjacent cutouts 71, 72a and 72b and 91, 92a and 92b or between a chamfered edge of the pixel electrode 191 and an edge of a cutout 92a or 92b adjacent thereto ranges from about 15 to about 25 microns. Preferably, the distance Wp ranges from about 21 to about 25 microns. The cutouts 71, 72a, and 72b are substantially inversely symmetrical with respect to a second stem 131b of a storage electrode line 131.

The lower cutout 72a and the upper cutout 72b both include an oblique portion that extends approximately from a left edge of the pixel electrode 191 to approximately a lower edge or an upper edge of the pixel electrode 191, and transverse and longitudinal portions that extend from respective ends of the oblique portion along edges of the pixel electrode 191, overlapping the edges of the pixel electrode 191, and forming obtuse angles with the oblique portion.

The center cutout 71 includes a substantially central transverse portion that extend from approximately the second edge of the pixel electrode 191 along the second stem 131b of the storage electrode line 131, a pair of oblique portions extending from an end of the central transverse portion approximately to a first edge of the pixel electrode and forming oblique angles with the central transverse portion, and a pair of terminal longitudinal portions extending from the ends of the respective oblique portions along the first edge of the pixel electrode 191, overlapping the first edge of the pixel electrode 191, and making obtuse angles with the respective oblique portions. The first edge may be a right edge of the pixel electrode and the second edge may be a left edge of the pixel electrode.

The number of the cutouts 71-72b may vary depending on design factors, and the light blocking member 220 may overlap the cutouts 71-72b to block the light leakage through the cutouts 71-72b.

Alignment layers (not shown), which may be homeotropic, are applied on inner surfaces of the TFT array panel 100 and the common electrode panel 200, and polarizers 12 and 22 are provided on outer surfaces of the TFT array panel 100 and the common electrode panel 200 so that their polarization axes may be crossed and one of the polarization axes may be parallel to the gate lines 121. One of the polarizers 12 and 22 may be omitted when the LC panel assembly is a reflective LCD.

The LC panel assembly may further include a retardation film (not shown) for compensating the retardation of the LC layer 3.

The LC panel assembly may further include a backlight unit (not shown) for supplying light to the LC layer 3 through the polarizers 12 and 22, the retardation film, and the TFT array panel 100 and the common electrode panel 200.

The LC layer 3 may have a negative dielectric anisotropy and be subjected to a vertical alignment such that the LC molecules 31 in the LC layer 3 are aligned with their long axes being substantially vertical to the surfaces of the TFT array panel 100 and the common electrode panel 200 when there is no electric field. Accordingly, incident light is unable to pass through the crossed polarization system 12 and 22.

Upon applying the common voltage to the common electrode 270 and a data voltage to the pixel electrodes 191, an electric field that is substantially perpendicular to the surfaces of the TFT array panels 100 and the common electrode panel 200 is generated and both the pixel electrodes 191 and the common electrode 191 are referred to as field generating electrodes. The LC molecules 31 change orientation in response to the electric field so that their long axes may be arranged substantially perpendicular to the field direction.

The cutouts 71, 72a, and 72b and 91, 92a, and 92b of the field generating electrodes 191 and 270 and the edges of the pixel electrodes 191 distort the electric field so that the tilt direction of the LC molecules 31 is determined by a horizontal component. The horizontal component is substantially perpendicular to the edges of the cutouts 71, 72a, and 72b and 91, 92a, and 92b and the edges of the pixel electrodes 191.

Referring to FIG. 5, a set of the cutouts 71, 72a, and 72b and 91, 92a, and 92b divides a pixel electrode 191 into a plurality of sub-areas and each sub-area has two major edges arranged oblique to the primary edges of the pixel electrode 191. Since most of the LC molecules 31 on each sub-area tilt are perpendicular to the major edges, the azimuthal distribution of the tilt directions are localized to about four directions, thereby increasing the reference viewing angle of the LCD.

At least one of the cutouts 71, 72a, and 72b and 91-92b may be substituted with protrusions (not shown) or depressions (not shown). The protrusions may be made of an organic material or an inorganic material and arranged on or below the field-generating electrodes 191 or 270.

The shapes and the arrangements of the cutouts 71-72b and 91-92b may be variously modified.

Referring again to FIG. 1, the gray voltage generator 800 generates two sets of a plurality of (reference) gray voltages related to the transmittance of the pixels. The (reference) gray voltages in one set have a positive polarity with respect to the common voltage Vcom, and the gray voltages in the other set have a negative polarity with respect to the common voltage Vcom.

The gate driver 400 is connected e.g., coupled, with the gate lines $G_1$-$G_n$ of the panel assembly 300 and synthesizes a gate-on voltage Von and a gate-off voltage Voff to generate the gate signals for application to the gate lines $G_1$-$G_n$.

The data driver 500 is connected e.g., coupled, with the data lines $D_1$-$D_m$ of the panel assembly 300 and applies data signals, which are selected from the gray voltages supplied from the gray voltage generator 800, to the data lines $D_1$-$D_m$. However, when the gray voltage generator 800 generates a number of the reference gray voltages that is less than all the gray voltages for all the grays, the data driver 500 may divide the reference gray voltages to generate all the gray voltages and select the data signals from among the gray voltages.

The signal controller 600 controls the gate driver 400 and the data driver 500, etc.

Each of driving devices 400, 500, 600 and 800 may include at least one integrated circuit (IC) chip mounted or attached on the LC panel assembly 300 or on a flexible printed circuit (FPC) film in a tape carrier package (TCP) type, which are attached e.g., coupled, with the panel assembly 300. Alternately, at least one of the driving devices 400, 500, 600 and 800 may be integrated into the panel assembly 300 along with the signal lines $G_1$-$G_n$ and $D_1$-$D_m$ and the switching elements Q. Alternatively, all the driving devices 400, 500, 600 and 800 may be integrated into a single IC chip, but at least one of the driving devices 400, 500, 600 and 800 or at least one circuit element in at least one of the processing units devices 400, 500, 600 and 800 may be provided outside of the single IC chip.

The operation of the above-described LCD is described below.

The signal controller 600 is supplied with input image signals R, G and B and input control signals for controlling the display thereof from a graphics controller (not shown), e.g., an external graphics controller. The input image signals R, G and B include luminance information of pixels PX and the luminance has a predetermined number of, for example, $1024(=2^{10})$, $256(=2^8)$, or $64(=2^6)$ grays. The input control signals include for example, a vertical synchronization signal Vsync, a horizontal synchronization signal Hsync, a main clock MCLK, and a data enable signal DE.

On the basis of the input control signals and the input image signals R, G and B, the signal controller 600 generates gate control signals CONT1 and data control signals CONT2 and then processes the image signals R, G and B that are suitable for operating of the panel assembly 300 and the data driver 500. The signal controller 600 transmits the scanning control signals CONT1 to the gate driver 400 and transmits the processed image signals DAT and the data control signals CONT2 to the data driver 500. The output image signals DAT are digital signals having a predetermined number of values (or grays).

The gate control signals CONT1 include a scanning start signal STV for instructing to start scanning and at least one clock signal for controlling the output period of the gate-on voltage Von. The scanning control signals CONT1 may further include an output enable signal OE for defining the duration of the gate-on voltage Von.

The data control signals CONT2 may include a horizontal synchronization start signal STH for informing of start of data transmission for a row of pixels PX, a load signal LOAD for instructing to apply the data signals to the data lines $D_1$-$D_m$, and a data clock signal HCLK. The data control signal CONT2 may further include an inversion signal RVS for reversing the polarity of the voltage of the data signals relative to the common voltage Vcom.

Responsive to the data control signals CONT2 from the signal controller 600, the data driver 500 receives a packet of the digital image signals DAT for the row of pixels PX from the signal controller 600, converts the digital image signals DAT into analog data signals selected from the gray voltages, and applies the analog data signals to the data lines $D_1$-$D_m$. The number of the gray voltages generated by the gray voltage generator 800 is equal to the number of the grays represented by the digital output image signals DAT.

The gate driver 400 applies the gate-on voltage Von to a gate line $G_1$-$G_n$ in response to the scanning control signals CONT1 received from the signal controller 600, thereby turning on the switching transistors Q coupled thereto. The data signals applied to the data lines $D_1$-$D_m$ are then transmitted to the pixels PX through the activated switching transistors Q.

The difference between the voltage of a data signal and the common voltage Vcom applied to a pixel PX is represented as a voltage across the LC capacitor $C_{LC}$ of the pixel PX, which is referred to as a pixel voltage. The LC molecules in the LC capacitor $C_{LC}$ have orientations depending on the magnitude of the pixel voltage, and the molecular orientations determine the polarization of light passing through the LC layer 3. The polarizer(s) converts the light polarization into the light transmittance such that the pixel PX has a luminance represented by a gray of the data signal.

By repeating this procedure by a unit of a horizontal period (referred to as "1H" and equal to one period of the horizontal synchronization signal Hsync and the data enable signal DE), all gate lines $G_1$-$G_n$ are sequentially supplied with the gate-on voltage Von, thereby applying the data signals to all pixels PX to display an image for a frame.

When the next frame starts after one frame finishes, the inversion control signal RVS applied to the data driver 500 is controlled such that the polarity of the data signals is reversed ("frame inversion"). The inversion control signal RVS may be also controlled such that the polarity of the data signals flowing in a data line are periodically reversed during one frame, e.g., row inversion and dot inversion, or the polarity of the data signals in one packet are reversed, e.g., column inversion and dot inversion.

In the meantime, the voltage across the LC capacitor $C_{LC}$ reorient the LC molecules in the LC layer 3 into a stable state corresponding to the voltage. The reorientation of the LC molecules takes time because the response time of the LC molecules is relatively slow. The LC molecules continue to reorient themselves to vary the light transmittance until they reach the stable state on the condition that the application of the voltage across the LC capacitor CLC is maintained. When the LC molecules reach the stable state and stop reorienting, the light transmittance becomes fixed.

A pixel voltage in the stable state is referred to as a target pixel voltage and a light transmittance in the stable state is referred to as a target light transmittance. The target pixel voltage and the target light transmittance have one-to-one correspondence.

Since the time for turning on the switching element Q of each pixel PX to apply a data voltage to the pixel is limited, it is difficult for the LC molecules in the pixel PX to reach the stable state when the data voltage is applied. However, even though the switching element Q is turned off, the voltage across the LC capacitor CLC remains and the LC molecules continue reorienting, which changes the capacitance of the LC capacitor CLC. Ignoring leakage current, the total amount of electrical charges stored in the LC capacitor CLC is kept constant when the switching element Q turns off since one terminal of the LC capacitor CLC is floating. Therefore, the capacitance of the LC capacitor CLC varies due to the variation of the voltage across the LC capacitor CLC, i.e., the pixel voltage.

Consequently, when a pixel PX is supplied with a data voltage corresponding to a target pixel voltage (referred to as a "target data voltage" hereinafter), which is determined in the stable state, an actual pixel voltage of the pixel PX may be different from the target pixel voltage such that the pixel PX may not reach a corresponding target light transmittance. The actual pixel voltage becomes increasingly different from the target pixel voltage as the difference between the target transmittance and an actual light transmittance of the pixel PX increases.

Accordingly, a data voltage applied to the pixel PX is determined to be greater or less than a target data voltage and difference between the applied data voltage and the target voltage is referred to as "the overshooting voltage".

Since the overshooting may be insufficient for obtaining the target luminance, a predetermined voltage is pre-applied to the pixel PX to pre-tilt the LC molecules and then, the main data voltage with or without the overshooting voltage is applied to the pixel PX. The predetermined voltage is referred to as "the pre-tilt voltage" hereinafter.

In addition, there is no overshooting for the highest target voltage and the lowest target voltage for obtaining the highest available luminance.

Accordingly, the range of the gray voltages generated by the gray voltage generator 800 is substantially equal to the range of the target data voltage.

For purposes of descriptive convenience, the LCD is assumed to be a normally black mode LCD and the positive-polarity gray voltages are determined from among the two sets of the gray voltages that are generated by the gray voltage generator 800.

The highest gray voltage is substantially equal to the highest target data voltage (referred to as "the white voltage" hereinafter) for the highest luminance, and the lowest gray voltage is substantially equal to the lowest target voltage (referred to as "the black data voltage" hereinafter) for the lowest luminance. However, the lowest gray voltage may be lower than the lowest target voltage. For example, regarding a normally white mode LCD, the target data voltage for the highest luminance is the lowest, and the target data voltage for the lowest luminance is the highest.

The highest target voltage relative to the common voltage Vcom is preferably greater than about 6V for obtaining an appropriate luminance.

For example, when the target data voltages relative to the common voltage Vcom range from about 0V to about 7.3V, the positive-polarity gray voltages relative to the common voltage Vcom range from about 0V to about 7.3V and the negative-polarity gray voltages relative to the common voltage Vcom range from about −7.3V to about 0V. Therefore, the black voltage having positive polarity is equal to about 0V, and the white voltage having positive polarity is equal to about 7.3V. For 8-bit image signals having 256 grays, the zero-th voltage is equal to about 0V, and the 255-th gray voltage is equal to about 7.3V.

The range of the gray voltages, the range of the target data voltages, and the number of the grays may vary.

For descriptive convenience, the target data voltage relative to the common voltage Vcom is referred to as "the target data voltage," unless otherwise noted.

According to an embodiment of the invention, the signal controller 600 or a separate image signal modifier modifies an image signal of a frame for a pixel to generate a modified current image signal based on an image signal of an immediately previous frame for the pixel and an image signal of an immediately next frame for the pixel. Hereinafter, a frame related to the image signal to be modified is referred to as "the current frame," a frame immediately previous to the current frame is referred to as "the previous frame," and a frame immediately next to the current frame is referred to as "the next frame." Likewise, an image signals of the current frame, a previous frame, and a next frame are referred to as "the current image signal," "the previous image signal," and "the next image signal" hereinafter. In addition, a modified current image signal is referred to as "the modified image signal" hereinafter.

The image signal modification for an LCD according to an embodiment of the invention is described below.

Figure 7:
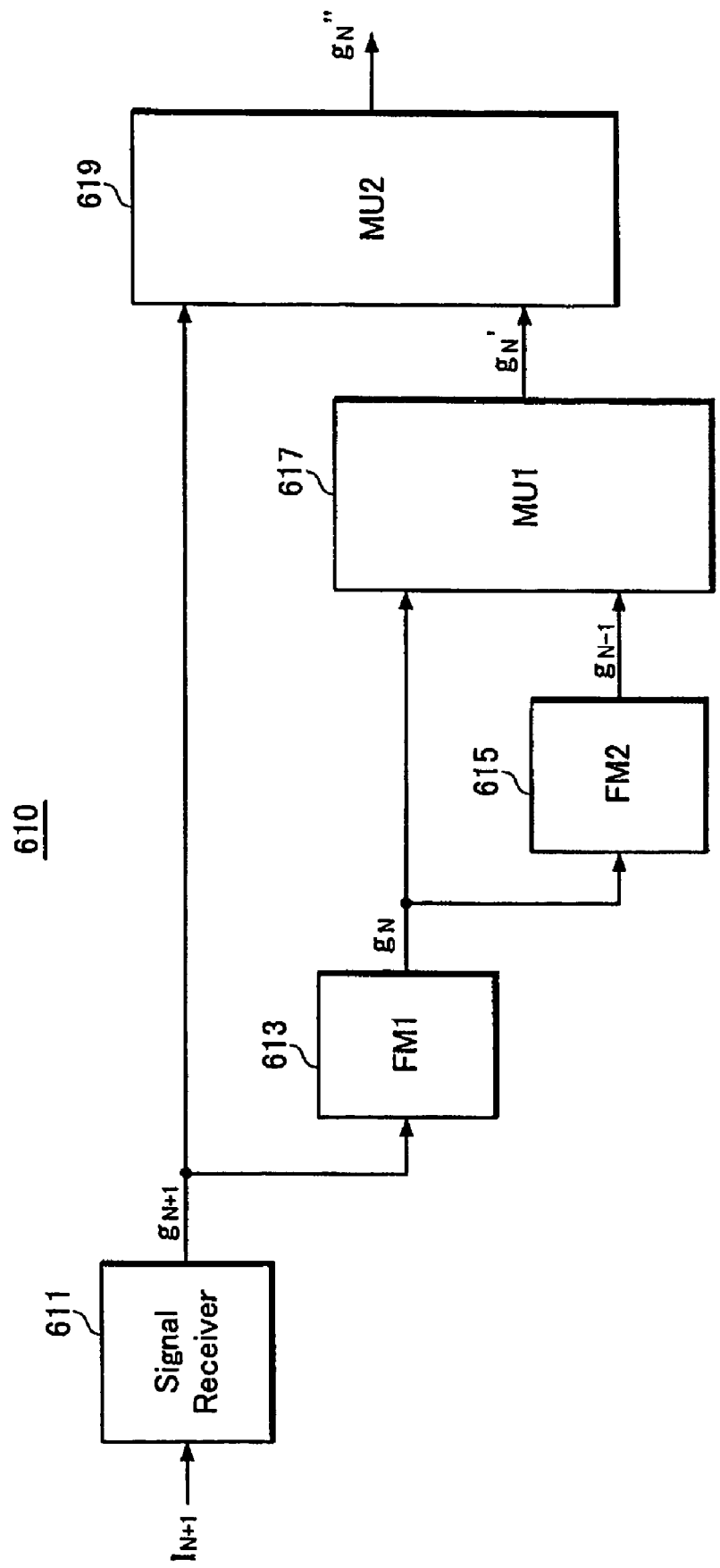
FIG. 7 is a block diagram of an image signal modifier of an LCD according to an embodiment of the invention.
Figure 8:
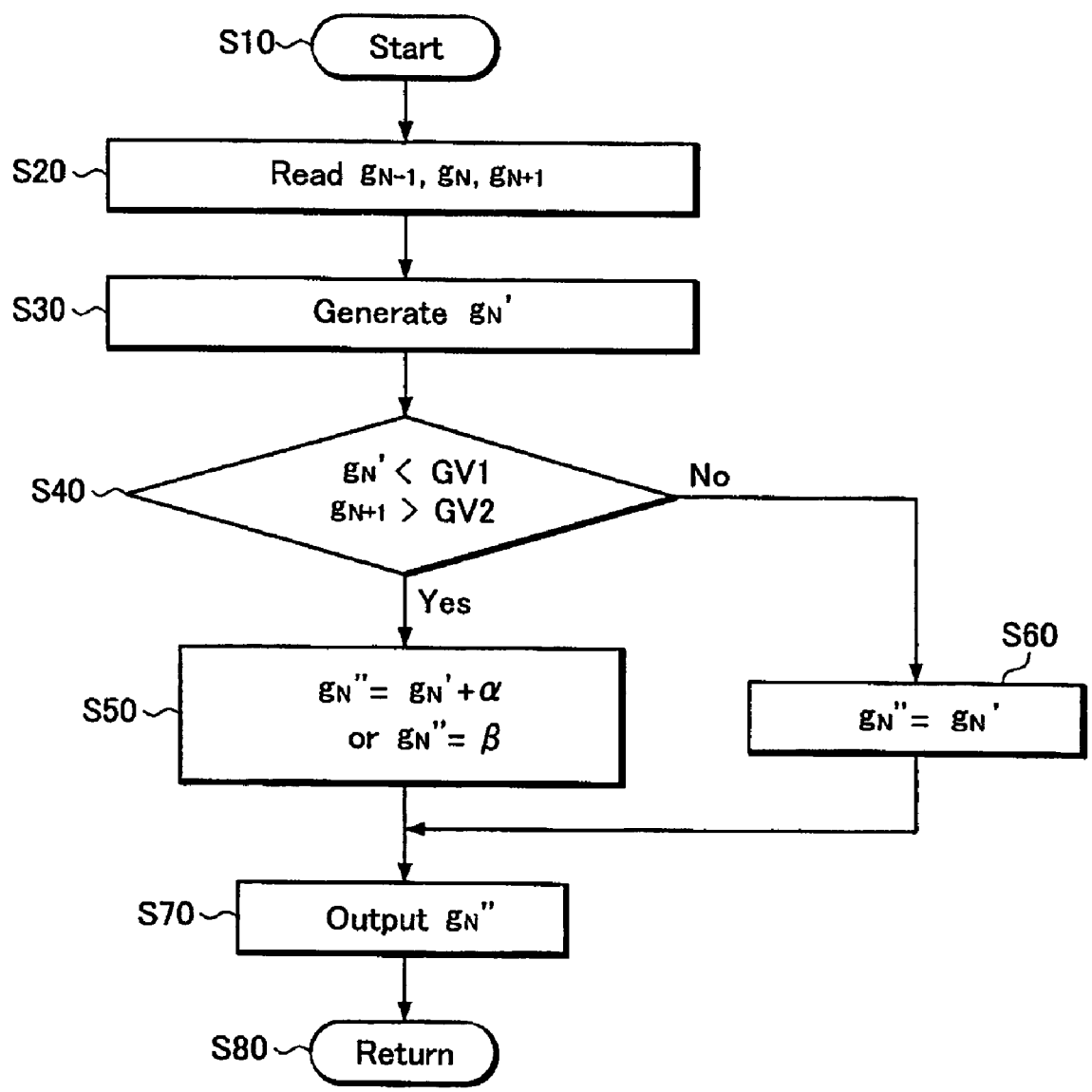
FIG. 8 is a flow chart for the operation of the image signal modifier shown in FIG. 7.

FIG. 7 is a block diagram of an image signal modifier of an LCD according to an embodiment of the invention FIG. 8 is a flow chart for the operation of the image signal modifier shown in FIG. 7.

As shown in FIG. 7, an image signal modifier 610 according to this embodiment includes a signal receiver 611, a first frame memory (FM1) 613 coupled with the signal receiver 611, a second frame memory (FM2) 615 coupled with the first frame memory 613, a first modification unit 617 (MU1) coupled with the first frame memory 613 and the second frame memory 615, and a second modification unit (MU2) 619 coupled with the signal receiver 611 and the first modification unit 617. The image signal modifier 610 or its components may be included in the signal controller 600 shown in FIG. 1, or the image signal modifier may be a stand-alone device.

For descriptive convenience, the current frame, the previous frame, and the next frame are denoted as reference characters N, (N−1), and (N+1), respectively.

Upon receiving an input image signal $I_{N+1}$ for a pixel PX from a signal source (not shown), the signal receiver 611 of the image signal modifier 610 shown in FIG. 7 converts the input image signal $I_{N+1}$ into another input image signal $g_{N+1}$ so that the converted image signal $g_{N+1}$ may be processed by the image signal modifier 610. The signal receiver 611 provides the converted image signal $g_{N+1}$ as a next image signal for the first frame memory 611 and the second modification unit 619.

The first frame memory 613 transmits a current image signal $g_N$ for the pixel PX stored therein to the second frame memory 615 and the first modification unit 617, and the first frame memory 613 stores the next image signal $g_{N+1}$ receives from the signal receiver 611.

The second frame memory 615 transmits a previous image signal $g_{N-1}$ for the pixel PX stored therein to the first modification unit 617, and the second frame memory 615 stores the current image signal $g_N$ received from the first frame memory 613.

The first frame memory 613 and the second frame memory 615 may be incorporated into a signal memory unit.

The first modification unit 617 modifies the current image signal $g_N$ received from the first frame memory 613 based on the previous image signal $g_{N-1}$ received from the second frame memory 615 to generate a preliminary signal $g_N'$ to be transmitted sent to the second modification unit 619.

The second modification unit 619 modifies the preliminary signal $g_N'$ based on the next image signal $g_{N+1}$ received from the signal receiver 611 to generate a modified signal $g_N''$ to be output.

The operations for modifying the image signal of the first modification unit 617 and the second modification unit 619 are described below with reference to FIG. 8.

Upon starting the operation, the first modification unit 617 and the second modification unit 619 read the previous image signal $g_{N-1}$, the current image signal $g_N$, and the next image signal $g_{N+1}$ in operation S20.

In operation S30, the first modification unit 617 removes modification reference data corresponding to the pair of the previous image signal $g_{N-1}$ and the current image signal $g_N$ from a lookup table (not shown) and performs a predetermined calculation to generate the preliminary signal $g_N'$.

The modification reference data may be obtained experimentally based on the characteristics of the LCD.

For example, when the previous image signal $g_{N-1}$ is less than the current image signal $g_N$, the preliminary signal $g_N'$ may be equal to or larger than the current image signal $g_N$.

When the difference between the previous image signal $g_{N-1}$ and the current image signal $g_N$ is less than a predetermined value, the preliminary signal $g_N'$ may be equal to the current image signal $g_N$.

However, the preliminary signal $g_N'$ for the current image signal $g_N$ having the highest gray (the white gray) is always substantially equal to the current image signal $g_N$. For 8-bit image signals that can have the zero-th to the 255-th grays, the modified signal for the current image signal $g_N$ having the 255-th gray has the 255-th gray. Thus, the current image signal $g_N$ representing the white gray is not modified and there is no overshooting.

In operation S40, the second modification unit 619 compares the preliminary signal $g_N'$ received from the first modification unit 617 with a first predetermined value GV1 and also compares the next image signal $g_{N+1}$ with a second predetermined value GV2.

When the preliminary signal $g_N'$ is less than the first predetermined value GV1 and the next image signal $g_{N+1}$ is greater than the second predetermined value GV2, a modification value $\alpha$ is added to the preliminary signal $g_N'$ to form the modified signal $g_N''$ in operation S50. Alternatively, in operation S50, the modified signal $g_N''$ may be a constant $\beta$ regardless of the preliminary signal $g_N'$.

The modification value a may vary in different regions of the preliminary signal $g_N'$ and the next image signal $g_{N+1}$. The modified signal $g_N''$ is converted into a pre-tilt voltage to be applied to the pixel PX, thereby pre-tilting the LC molecules in an amount depending on the difference in the gray between the N-th frame and the (N+1)th frame.

In operation S60, when the preliminary signal $g_N'$ is equal to or greater than the first predetermined value GV1, or the next image signal $g_{N+1}$ is equal to or less than the second predetermined value GV2, the modified signal $g_N''$ is substantially equal to the preliminary signal $g_N'$.

In operation S70, the modified signal $g_N''$ is output and the operation is repeated in operation S80.

The response time according to a pre-tilt voltage and a white voltage is described below with reference to FIG. 9.

Figure 9:
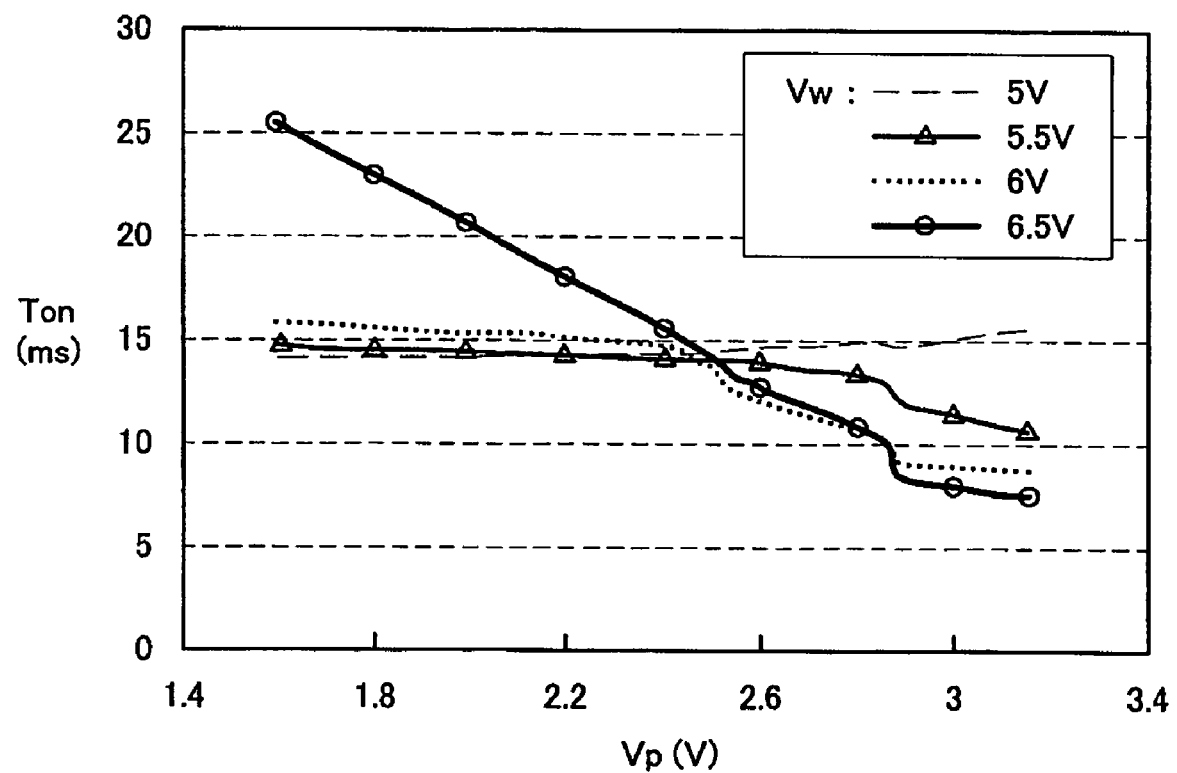
FIG. 9 is a graph showing a response time as function of a pre-tilt voltage for various white voltages in the LCD shown in FIGS. 3, 4, 5, and 6.

FIG. 9 is a graph showing a response time as a function of a pre-tilt voltage for various white voltages in the LCD shown in FIGS. 3, 4, 5, and 6.

The distance Wp between adjacent cutouts 71, 72a, and 72b and 91, 92a, and 92b was about 23 microns. A black voltage Vb, a pre-tilt voltage Vp, and a white voltage Vw were applied to a pixel and a rising time Ton, i.e., the response time when there was a rising voltage was measured. The white voltage Vw was varied from about 5V to about 6.5V. The rising time Ton for a given data voltage is defined as a time required for the luminance to reach about 90% of the target luminance from about 10% of the target luminance.

As shown in FIG. 9, when the white voltage Vw is equal to or greater than about 5.5V, the response time Ton for the pre-tilt voltage Vp greater than about 2.5V was reduced as the pre-tilt voltage Vp increased. Furthermore, the response time for the pre-tilt voltage Vp greater than about 2.5V reduced while the white voltage Vw increases. On the contrary, when the white voltage Vw is equal to about 5V, the response time increased as the pre-tilt voltage Vp increased.

The value of the pre-tilt voltage Vp that make the response time begin to decrease depends on the distance Wp between adjacent cutouts 71, 72a, and 72b and 91, 92a, and 92b.

The response time of an LCD, which decreases as the difference between the voltage to be applied and the voltage that has been applied increases, is given:

$$\text{Ton} \propto \frac{\gamma d^2}{\Delta\varepsilon(V^2 - V_0^2)},$$

where $\gamma$ denotes viscosity of the LC layer, d denotes a cell gap, i.e., the thickness of the LC layer, $\Delta\varepsilon$ denotes dielectric anisotropy, V denotes the voltage to be applied, and Vo denotes the data voltage that has been applied.

The LCD according to the embodiments of the invention basically follows the above-described relation when the pre-tilt voltage Vp is greater than about 2.5V, as shown in FIG. 9.

Alternatively, conventional VA mode LCDs do not follow the above-described relation and the increase of the response time by increasing the data voltage is limited. This may result from a disorderly arrangement of the LC molecules in the cutouts 71, 72a, and 72b and 91, 921, and 92b and the lateral field generated by the data lines 171, which yield texture.

An example of generating a modified signal for an input image signal is described below with reference to FIG. 10 and FIG. 11.

Figure 10:
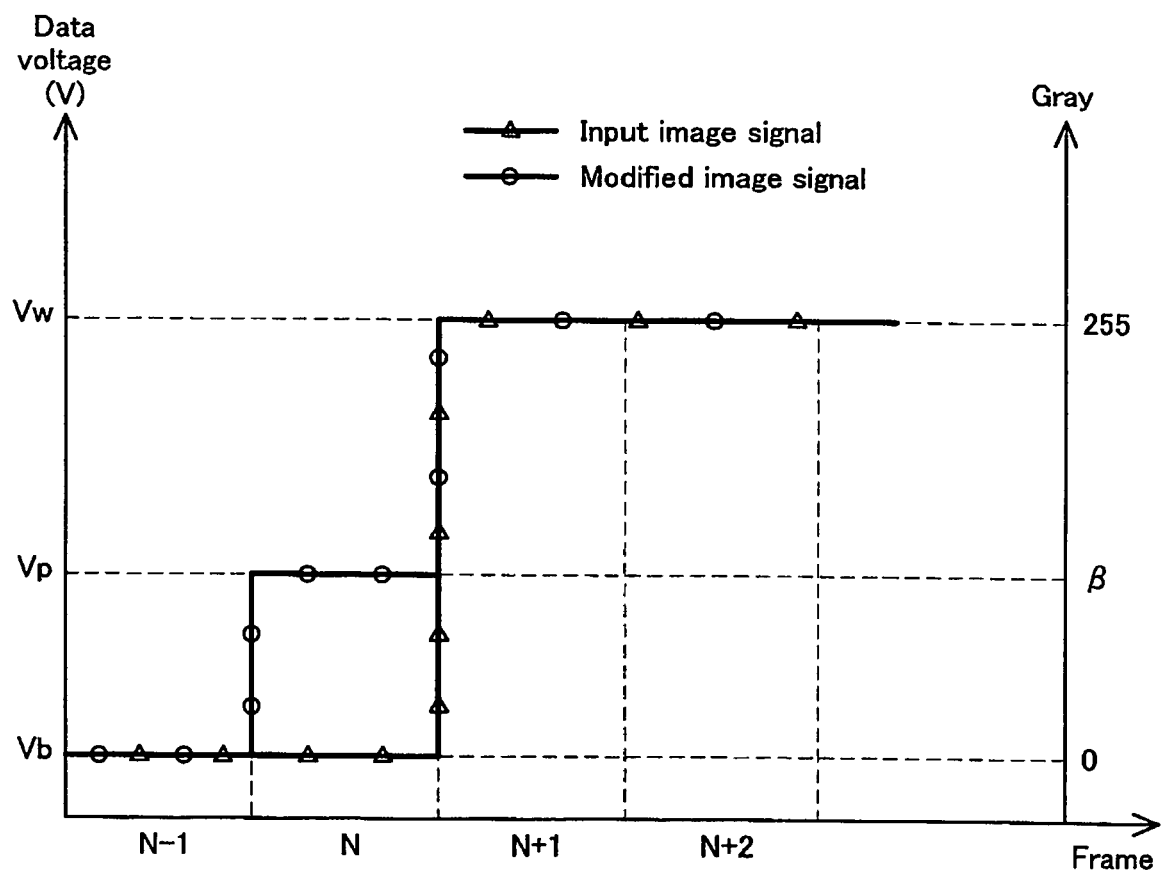
FIG. 10 shows the data voltages for the input image signal and the modified image signal.

FIG. 10 shows the data voltages for the input image signal and the modified image signal. FIG. 11 shows the temporal variation of the transmittance when applying the data voltage for the modified image signal.

In FIG. 10, the input image signals in the (N−1)th frame and in the N-th frame have the zero-th gray and the image signals in the (N+1)th frame and successive frames have the 255-th gray. The data voltages are shown to have positive polarity.

Since there is no difference in gray between the (N−1)th frame and the N-th frame, the preliminary signal for the N-th frame is equal to "0." Since there is no difference in gray between the (N+1)th frame and the (N+2)th frame, the preliminary signal for the (N+2)th frame is equal to "255." Since the difference between the N-th frame and the (N+1)th frame is equal to "255," the preliminary signal is also equal to "255."

For example, it is assumed that the first predetermined value GV1 and the second predetermined value GV2 are equal to "40" and "210," respectively, and the preliminary signal is a constant (for example, $\beta$="91") as discussed above in S50. The modified signal generated by the second modification unit 619 is equal to "91" in the N-th frame and equal to the preliminary signal in the following frames. When the gray voltages range from about 0V to about 7.3V, the data voltage chosen from the gray voltages is equal to 0V (the black voltage Vb) in the (N−1)th frame, equal to about 2.6V (the pre-tilt voltage) in the N-th frame, and equal to 7.3V (the white voltage Vw) in successive frames from the (N+1)th frame.

Figure 11:
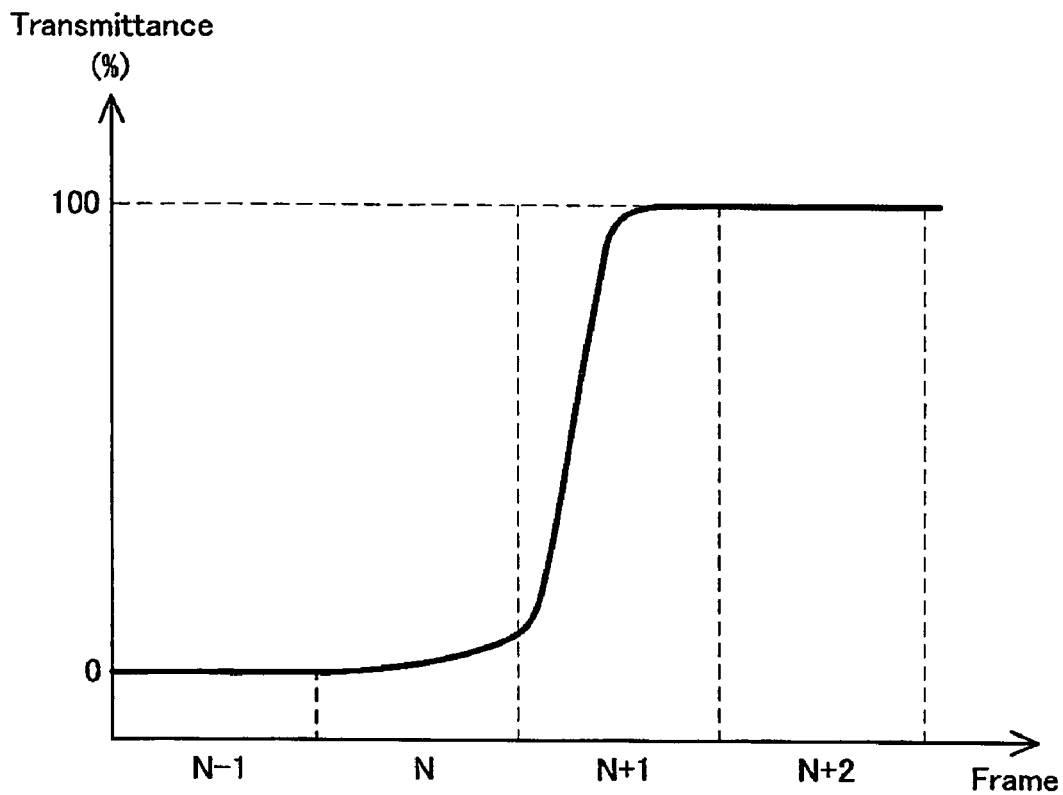
FIG. 11 shows the temporal variation of the transmittance upon application of the data voltage for the modified image signal.

FIG. 11 shows that when a sufficiently high pre-tilt voltage Vp is applied to a pixel PX in the N-th frame and a sufficiently high white voltage Vw is applied to the pixel PX in the (N+1)th frame, the luminance more quickly approaches to the target luminance.

The luminance and the response time for various conditions were measured and shown in TABLE 1. The applied voltage was the black voltage Vb, the pre-tilt voltage Vp, and the white voltage Vw with or without an overshoot voltage in successive frames. The highest data voltage that can be applied to the pixels PX was about 7.4V.

TABLE 1

|  | White Voltage (Vw) | Overshoot Voltage | Pre-tilt Voltage (Vp) | Luminance (Tw) | Rising Time (Ton) |
|---|---|---|---|---|---|
| (1) | 5.6 V | 1.1 V | 2.2 V | 611 cd | 16.5 ms |
| (2) | 6.1 V | 1.3 V | 2.3 V | 645 cd | 5.97 ms |
| (3) | 6.3 V | 1.1 V | 2.4 V | 656 cd | 6.53 ms |
| (4) | 6.5 V | 0.9 V | 2.5 V | 665 cd | 6.33 ms |
| (5) | 6.7 V | 0.64 V | 2.6 V | 678 cd | 6.05 ms |
| (6) | 7.0 V | 0.35 V | 2.7 V | 692 cd | 5.75 ms |
| (7) | 7.1 V | 0.2 V | 2.8 V | 700 cd | 5.01 ms |
| (8) | 7.3 V | 0.0 V | 2.9 V | 707 cd | 5.78 ms |
| (9) | 7.3 V | 0.0 V | 2.6 V | 707 cd | 8.12 ms |
| (10) | 7.3 V | 0.0 V | 2.4 V | 707 cd | 16.73 ms |

As shown in TABLE 1, the luminance of the LCD increases as the white voltage Vw increases and the response time generally decreases as the pre-tilt voltage Vp increases. The conditions (8) and (9) have the pre-tilt voltage Vp that is at least about 2.5V and do not include an overshoot voltage. In the conditions (8) and (9), the luminance Tw is about 15% greater than the condition (1) and the rising time Ton is smaller than a reference value 10 ms.

Accordingly, the image signal modification according to the embodiments of the invention reduces the response time without experiencing a loss of luminance and the number of grays. In particular, the image signal modification is effective for the LCD that include pixel electrodes, each pixel electrode being divided into two sub-pixel electrodes supplied with different voltages.

According to another embodiment of the invention, the image signal modifier modifies a current image signal for a pixel to generate a modified current image signal based only on a previous image signal for the pixel, which is described below with reference to FIGS. 12, 13, and 14.

Figure 12:
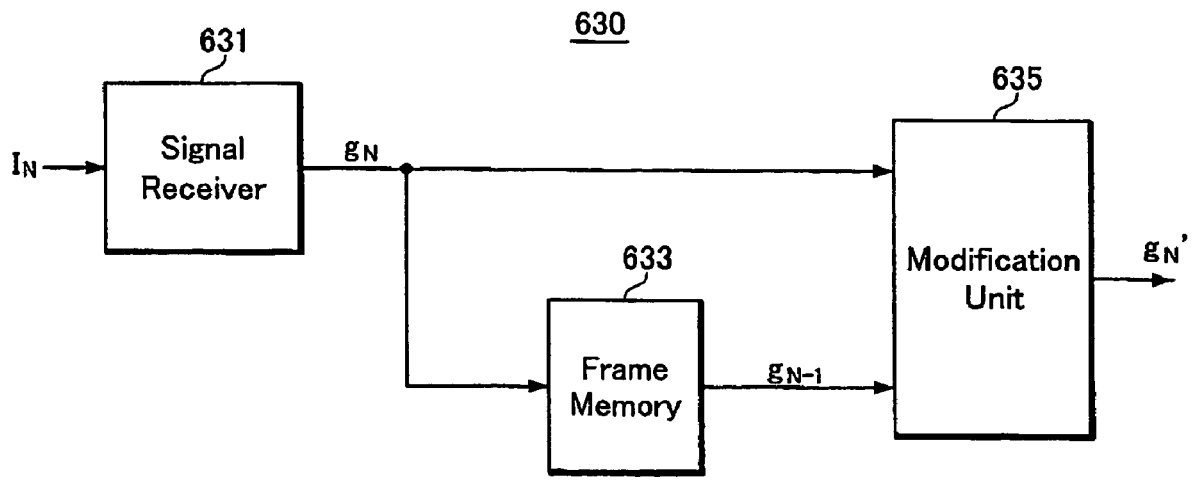
FIG. 12 is a block diagram of an image signal modifier of an LCD according to another embodiment of the invention.
Figure 13:
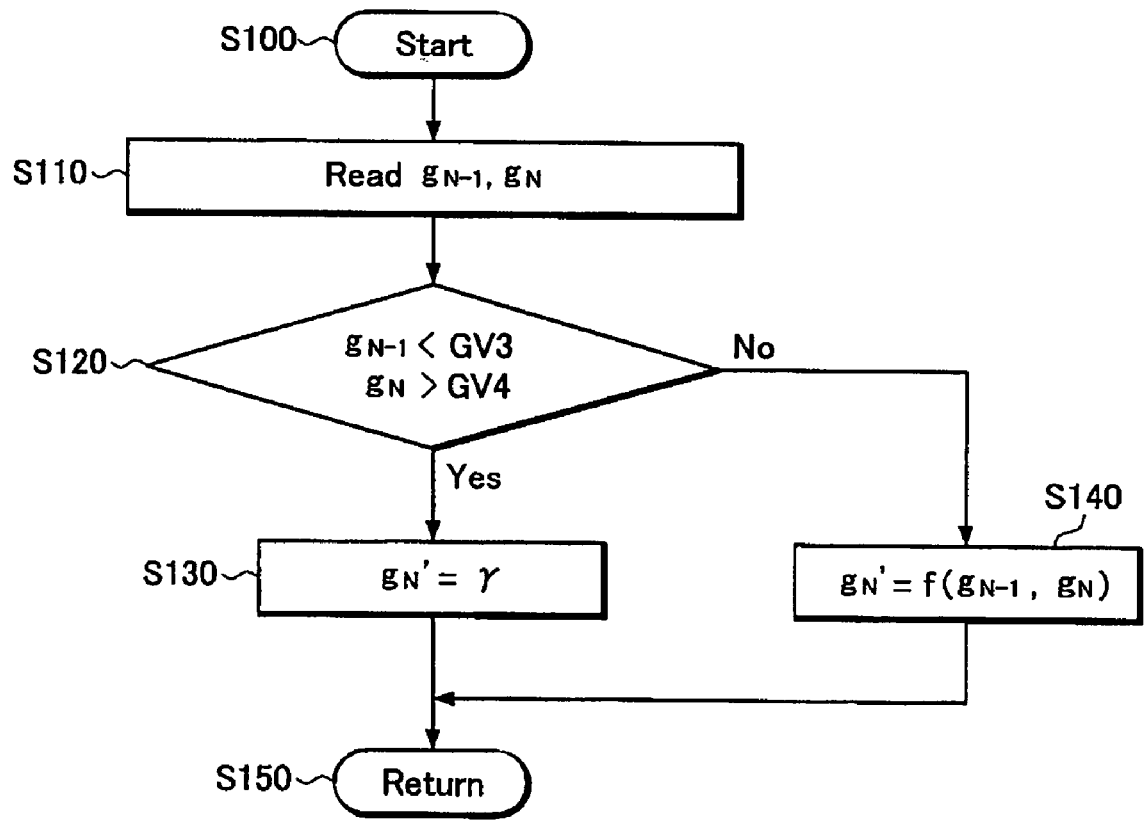
FIG. 13 is a flow chart for the operation of the image signal modifier shown in FIG. 12.

FIG. 12 is a block diagram of an image signal modifier of an LCD according to another embodiment of the invention. FIG. 13 is a flow chart for the operation of the image signal modifier shown in FIG. 12. FIG. 14 shows the data voltages for the input image signal and the modified image signal.

As shown in FIG. 12, an image signal modifier 630 according to another embodiment of the invention includes a signal receiver 631, a frame memory 633 coupled with the signal receiver 631, and a modification unit 635 coupled with the frame memory 633. The image signal modifier 630 or its components may be included in the signal controller 600 shown in FIG. 1, or the image signal modifier 630 may be a stand-alone device.

For purposes of descriptive convenience, the current frame and the previous frame, and the next frame are denoted as reference characters N, (N−1) and (N+1), respectively.

Upon receiving an input image signal IN from a signal source (not shown), the signal receiver 631 of the image signal modifier 630 shown in FIG. 12 converts the input image signal $I_N$ into another input image signal $g_N$ so that the converted image signal $g_N$ may be processed by the image signal modifier 610. The signal receiver 631 provides the converted image signal $g_N$ for the frame memory 631 and the modification unit 635.

The frame memory 633 transmits a previous image signal $g_{N-1}$ stored therein to the modification unit 635, and the frame memory 631 stores the current image signal $g_N$ from the frame memory 631.

The modification unit 635 modifies the current image signal $g_N$ received from the signal receiver 631 based on the previous image signal $g_{N-1}$ from the frame memory 633 to generate a modified signal $g_N'$ to be output.

The operations for performing the image signal modification of the modification unit 635 are described below with reference to FIG. 13.

Upon the start of the operation the modification unit 635 reads the previous image signal $g_{N-1}$ and the current image signal $g_N$ in operation S110.

In operation S120, the modification unit 635 compares the previous image signal $g_{N-1}$ with a third predetermined value GV3 and compares the current image signal $g_N$ with a fourth predetermined value GV4.

In operation S130, when the previous image signal $g_{N-1}$ is less than the third predetermined value GV3 and the current image signal $g_N$ is greater than the fourth predetermined value GV4, the modified signal $g_N'$ may be a constant γ. The modified image signal $g_N'$ is then converted into a pre-tilt voltage.

In operation S140, when the preliminary signal $g_N'$ is equal to or greater than the third predetermined value GV3, or when the next image signal $g_{N+1}$ is equal to or less than the fourth predetermined value GV4, the modified signal $g_N'$ is determined depending on the previous image signal $g_{N-1}$. The modified image signal $g_N'$ may be determined in the same manner that is used for determining the preliminary signal $g_N'$ in the above-described embodiment.

In operation S150, the modified image signal $g_N'$ is output and the operation is repeated or completed in operation S150.

An example of generating a modified signal for an input image signal is described below with reference to FIG. 14.

Figure 14:
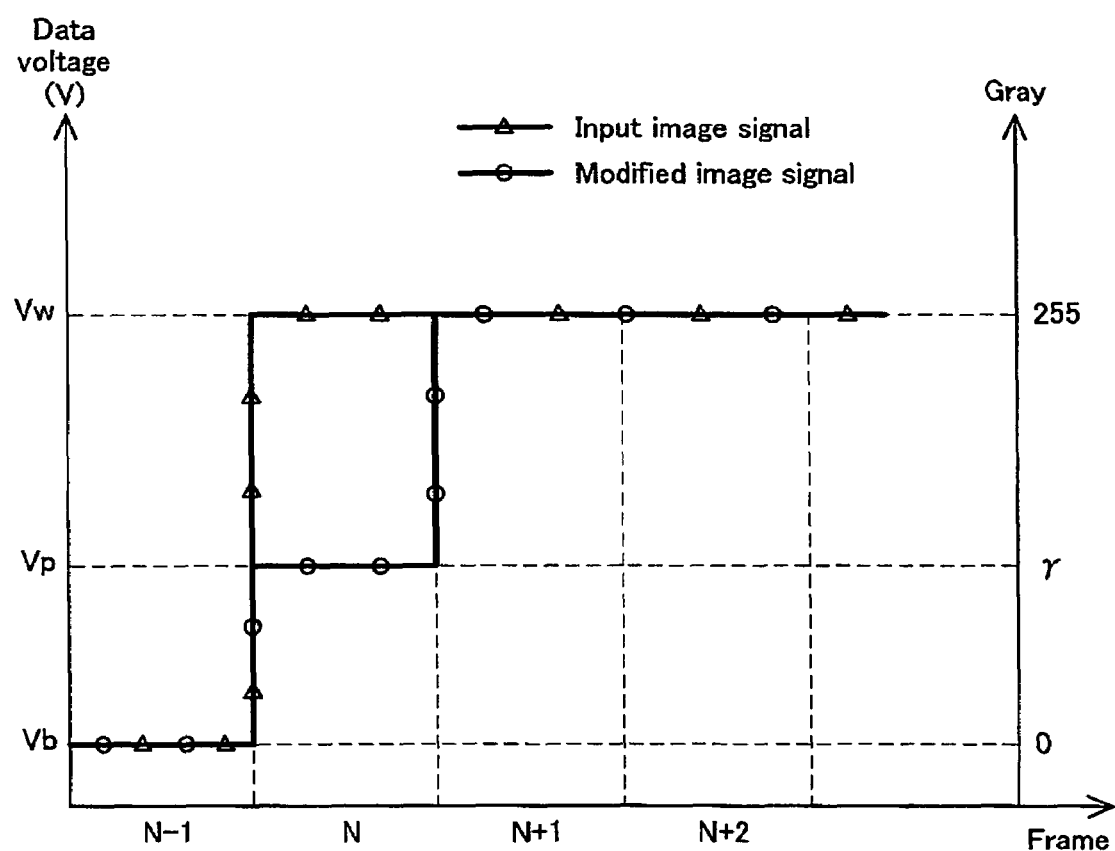
FIG. 14 shows the data voltages for the input image signal and the modified image signal.

In FIG. 14, the input image signals in the (N−1)th frame have the zero-th gray and the image signals in the N-th frame and successive frames have the 255-th gray. The data voltages shown in FIG. 14 have a positive polarity.

For example, it is assumed that when the third predetermined value GV3 and the fourth predetermined value GV4 are equal to "40" and "210," respectively, and γ="91," the modified signal generated by the second modification unit 635 is equal to "0" in the (N−1)-th frame, equal to "91" in the N-th frame, and equal to "255" in the following frames. When the gray voltages range from about 0V to about 7.3V, the data voltage selected from the gray voltages is equal to 0V (the black voltage Vb) in the (N−1)th frame, equal to about 2.6V (the pre-tilt voltage) in the N-th frame, and equal to 7.3V (the white voltage Vw) in successive frames from the (N+1)th frame.

As described above, when the gray varies from the black gray to the white gray, the luminance rapidly approaches the target luminance by applying a pre-tilt voltage instead of an overshooting voltage and the LCD may display images without a loss of luminance and a loss of the number of grays.

In addition, manufacturing cost is reduced when only one frame memory is used.

The image signal modification according to embodiments of the present invention may be also applied to a MVA (multi-domain vertical alignment) mode LCD and a SPVA (super-patterned vertical alignment) or a SVA (super vertical alignment) mode LCD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD), comprising:
a first substrate;
a first signal line arranged on the first substrate;
a second signal line arranged on the first substrate and intersecting the first signal line;
a thin film transistor coupled with the first signal line and the second signal line;
a pixel electrode coupled with the thin film transistor;
a second substrate facing the first substrate;
a common electrode arranged on the second substrate;
a liquid crystal layer interposing the first substrate and the second substrate;
a first tilt direction determining member arranged on the first substrate; and
a second tilt direction determining member arranged on the second substrate,
wherein the first tilt direction determining member is positioned about 15 microns to about 25 microns apart from the second tilt direction determining member.

2. The LCD of claim 1, wherein the first tilt direction determining member comprises a first cutout arranged at the pixel electrode or an edge of the pixel electrode, and the second tilt direction determining member comprises a second cutout arranged at the common electrode.

3. The LCD of claim 2, wherein the first cutout forms an oblique angle with a first edge of the pixel electrode.

4. The LCD of claim 3, wherein the first cutout comprises an end portion having a plurality of projections that are oblique relative to the first edge of the pixel electrode.

5. The LCD of claim 4, wherein the projections form an angle of about 45 degrees relative to the first edge of the pixel electrode.

6. The LCD of claim 2, wherein the first cutout or the second cutout has an end portion extending parallel to the second signal line and having an edge that is oblique relative to the second signal line.

7. The LCD of claim 6, wherein the edge of the end portion of the first cutout or the second cutout forms an angle of about 45 degrees relative to the second signal line.

8. The LCD of claim 2, wherein the second cutout comprises an end portion extending substantially parallel to a first edge of the pixel electrode and overlaps the first edge of the pixel electrode.

9. The LCD of claim 8, wherein the end portion of the second cutout comprises an edge that is oblique relative to the first edge of the pixel electrode.

10. The LCD of claim 8, wherein the end portion of the second cutout comprises a plurality of projections, each of the projections having an edge that is oblique relative to the first edge of the pixel electrode.

11. The LCD of claim 1, wherein the first tilt direction determining member comprises an edge of the pixel electrode, and the second tilt direction determining member comprises a cutout arranged at the common electrode.

12. The LCD of claim 11, wherein the cutout extends substantially parallel to the edge of the pixel electrode.

13. The LCD of claim 12, wherein the edge of the pixel electrode is curved.

14. The LCD of claim 13, wherein the second signal line is curved along the curved edge of the pixel electrode.

15. A liquid crystal display (LCD), comprising:
a first substrate;
a gate line arranged on the first substrate;
a gate insulating layer arranged on the gate line; a semiconductor layer arranged on the gate insulating layer;
a data line arranged on the gate insulating layer and on the semiconductor layer;
a drain electrode arranged on the semiconductor layer and spaced apart from the data line;
a pixel electrode coupled with the drain electrode and including a first cutout;
a second substrate facing the first substrate; and
a common electrode arranged on the second substrate and including a second cutout,
wherein the first cutout is positioned about 15 microns to about 25 microns apart from the second cutout.

16. The LCD of claim 15, wherein the first cutout is positioned about 21 microns to about 25 microns apart from the second cutout.

17. The LCD of claim 1, wherein the first tilt direction determining member is positioned about 21 microns to about 25 microns apart from the second tilt direction determining member.

18. A liquid crystal display, comprising:
a first substrate;
a first signal line arranged on the first substrate;
a second signal line arranged on the first substrate and intersecting the first signal line;
a thin film transistor coupled with the first signal line and the second signal line;
a pixel electrode coupled with the thin film transistor; a second substrate facing the first substrate;
a common electrode arranged on the second substrate;
a liquid crystal layer interposing the first substrate and the second substrate;
a first tilt direction determining member arranged on the first substrate; and
a second tilt direction determining member arranged on the second substrate,
a gray voltage generator generating a plurality of gray voltages;
an image signal modifier that receives first and second image signals for a pixel in two successive frames and generates a modified signal for the second image signal based on the first image signal, the modified signal having a modification value when the first image signal is smaller than a first predetermined value and the second image signal is greater than a second predetermined value; and
a data driver converting the modified signal into a data voltage selected from the plurality of gray voltages and applying the data voltage to the pixel,
wherein a distance between the first tilt direction determining member and the second tilt direction determining member is about 15 microns to about 25 microns.

19. The liquid crystal display of claim 18, wherein the modified signal is based upon the first image signal and the second image signal, when the first image signal is equal to or greater than the first predetermined value and the second image signal is equal to or smaller than the second predetermined value.

20. The liquid crystal display of claim 19, wherein the pixel comprises a plurality of domains and the modification value is varied depending on the distance.

21. The liquid crystal display of claim 20, wherein one of the plurality of gray voltages corresponding to the modification value is higher than about 2.5V when the distance is equal to from about 21 microns to about 25 microns.

22. The liquid crystal display of claim 19, wherein the image signal modifier comprises:
a frame memory storing the second image signal and outputting the first image signal stored therein; and a modification unit generating the modified signal for the second image signal based on the first image signal and the second image signal.

23. The liquid crystal display of claim 18, wherein a range of the plurality of gray voltages is substantially equal to a range of target voltages for obtaining target luminance of the pixel, and a highest available value for the modified signal is substantially equal to a highest available value of the first and second image signals.

24. The liquid crystal display of claim 23, wherein the highest value of the target voltages is equal to or greater than about 6V.

25. The liquid crystal display of claim 18, wherein the distance is between an edge of the first tilt direction determining member and an edge of the second tilt direction determining member, and the edges are disposed adjacent to each other.

26. A liquid crystal display, comprising:
a first substrate;
a first signal line arranged on the first substrate;
a second signal line arranged on the first substrate and intersecting the first signal line;
a thin film transistor coupled with the first signal line and the second signal line;
a pixel electrode coupled with the thin film transistor; a second substrate facing the first substrate;
a common electrode arranged on the second substrate;
a liquid crystal layer interposing the first substrate and the second substrate;
a first tilt direction determining member arranged on the first substrate;
a second tilt direction determining member arranged on the second substrate;
a gray voltage generator generating a plurality of gray voltages;
an image signal modifier that receives first and second image signals for a pixel in two successive frames and generates a modified signal for the second image signal based on the first image signal, the image signal modifier comprising a frame memory storing the second image signal and outputting the first image signal stored therein, and a modification unit generating the modified signal for the second image signal based on the first image signal and the second image signal; and
a data driver converting the modified signal into a data voltage selected from the plurality of gray voltages and applying the data voltage to the pixel,
wherein a distance between the first tilt direction determining member and the second tilt direction determining member is about 15 microns to about 25 microns.

* * * * *